United States Patent
Lerner et al.

(10) Patent No.: US 8,516,543 B2
(45) Date of Patent: *Aug. 20, 2013

(54) METHOD, SYSTEM, AND COMPUTER PROGRAM PRODUCT FOR FACILITATING COMMUNICATION IN AN INTEROPERABILITY NETWORK

(75) Inventors: Alexander Lerner, San Francisco, CA (US); Michael K. Dewey, Berkeley, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/293,038

(22) Filed: Nov. 9, 2011

(65) Prior Publication Data

US 2012/0059925 A1  Mar. 8, 2012

Related U.S. Application Data

(63) Continuation of application No. 12/775,394, filed on May 6, 2010, which is a continuation of application No. 10/858,709, filed on Jun. 1, 2004.

(60) Provisional application No. 60/511,573, filed on Oct. 14, 2003.

(51) Int. Cl.
*G06F 17/00* (2006.01)

(52) U.S. Cl.
USPC ............ 726/1; 709/223; 709/225; 709/230

(58) Field of Classification Search
USPC ..................... 726/1; 709/223, 225, 230
See application file for complete search history.

(56) References Cited

U.S. PATENT DOCUMENTS

| | | | |
|---|---|---|---|
| 6,587,876 B1 * | 7/2003 | Mahon et al. | 709/223 |
| 7,133,907 B2 | 11/2006 | Carlson et al. | |
| 7,181,532 B1 * | 2/2007 | Chan | 709/242 |
| 7,225,460 B2 * | 5/2007 | Barzilai et al. | 726/1 |
| 7,363,650 B2 * | 4/2008 | Moriconi et al. | 726/1 |
| 7,441,265 B2 | 10/2008 | Staamann et al. | |
| 7,480,799 B2 | 1/2009 | Champion | |
| 7,496,649 B2 * | 2/2009 | Lee et al. | 709/223 |
| 7,496,751 B2 | 2/2009 | de Jong et al. | |
| 7,627,891 B2 | 12/2009 | Williams et al. | |
| 7,665,125 B2 | 2/2010 | Heard et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |

(Continued)

OTHER PUBLICATIONS

Advisory Action from U.S. Appl. No. 12/775,394, dated Apr. 24, 2012.

(Continued)

*Primary Examiner* — Amare F Tabor
(74) *Attorney, Agent, or Firm* — Zilka-Kotab, PC

(57) ABSTRACT

Methods and apparatus are described for facilitating communication among a plurality of entities via an interoperability network. Each entity has policy data corresponding thereto governing interaction with the entity via the interoperability network. A message is transmitted from a first one of the entities to a second one of the entities. The first entity has first policy data corresponding thereto and the second entity has second policy data corresponding thereto. The transmitted message was handled in the network according to combined policy data representing a combination of the first and second policy data.

22 Claims, 24 Drawing Sheets

(56) References Cited

U.S. PATENT DOCUMENTS

| | | | |
|---|---|---|---|
| 8,095,594 B2 | 1/2012 | Beaven et al. | |
| 8,275,836 B2 | 9/2012 | Beaven et al. | |
| 8,453,201 B2 | 5/2013 | Lerner et al. | |
| 8,453,202 B2 | 5/2013 | Lerner et al. | |
| 8,453,203 B2 | 5/2013 | Lerner et al. | |
| 2003/0065942 A1 | 4/2003 | Lineman et al. | |
| 2003/0084168 A1 | 5/2003 | Erickson et al. | |
| 2004/0034797 A1* | 2/2004 | Becker Hof | 713/201 |
| 2004/0107360 A1 | 6/2004 | Herrmann et al. | |
| 2005/0005116 A1 | 1/2005 | Kasi et al. | |
| 2010/0281515 A1 | 11/2010 | Lerner et al. | |
| 2010/0281516 A1 | 11/2010 | Lerner et al. | |
| 2011/0131314 A1 | 6/2011 | Lerner et al. | |
| 2012/0059933 A1 | 3/2012 | Lerner et al. | |
| 2012/0060199 A1 | 3/2012 | Lerner et al. | |
| 2012/0060200 A1 | 3/2012 | Lerner et al. | |
| 2012/0079560 A1 | 3/2012 | Lerner et al. | |

OTHER PUBLICATIONS

Final Office Action from U.S. Appl. No. 12/775,394, dated Jan. 27, 2012.
Non-Final Office Action from U.S. Appl. No. 12/775,394, dated Jun. 16, 2011.
Advisory Action from U.S. Appl. No. 12/775,404, dated Apr. 17, 2012.
Final Office Action from U.S. Appl. No. 12/775,404, dated Feb. 1, 2012.
Non-Final Office Action from U.S. Appl. No. 12/775,404, dated Jun. 17, 2011.
Final Office Action from U.S. Appl. No. 13/016,950, dated Nov. 15, 2011.
Non-Final Office Action from U.S. Appl. No. 13/016,950, dated Jun. 3, 2011.
Non-Final Office Action from U.S. Appl. No. 13/293,023, dated Jan. 23, 2012.
Non-Final Office Action from U.S. Appl. No. 13/293,049, dated Apr. 11, 2012.
Non-Final Office Action from U.S. Appl. No. 13/293,059, dated Apr. 11, 2012.
Non-Final Office Action from U.S. Appl. No. 13/293,065, dated Apr. 12, 2012.
Non-Final Office Action from U.S. Appl. No. 13/293,070, dated Apr. 12, 2012.
Notice of Allowance from U.S. Appl. No. 10/858,709, dated Nov. 16, 2012.
Notice of Allowance from U.S. Appl. No. 13/293,049, dated Nov. 14, 2012.
Notice of Allowance from U.S. Appl. No. 13/293,059, dated Nov. 19, 2012.
Notice of Allowance from U.S. Appl. No. 13/293,065, dated Nov. 20, 2012.
Notice of Allowance from U.S. Appl. No. 13/294,070, dated Nov. 19, 2012.
Non-Final Office Action from U.S. Appl. No. 12/775,394, dated Jul. 20, 2012.
Final Office Action from U.S. Appl. No. 13/293,023, dated Jul. 2, 2012.
Non-Final Office Action from U.S. Appl. No. 13/485,741, dated Aug. 31, 2012.
Non-Final Office Action from U.S. Appl. No. 12/775,404, dated Jul. 20, 2012.
Non-Final Office Action from U.S. Appl. No. 13/314,101, dated Aug. 29, 2012.
Non-Final Office Action from U.S. Appl. No. 13/485,782, dated Feb. 28, 2013.
Notice of Allowance from U.S. Appl. No. 12/775,404, dated Mar. 21, 2013.
Notice of Allowance from U.S. Appl. No. 13/293,023, dated Apr. 10, 2013.
Notice of Allowance from U.S. Appl. No. 12/775,394, dated Mar. 27, 2013.
Notice of Allowance from U.S. Appl. No. 13/314,101, dated Mar. 21, 2013.
Notice of Allowance from U.S. Appl. No. 13/485,741, dated Mar. 6, 2013.
Non-Final Office Action from U.S. Appl. No. 13/485,760, dated Feb. 28, 2013.
Non-Final Office Action from U.S. Appl. No. 13/485,772, dated Feb. 28, 2013.
Notice of Allowance from U.S. Appl. No. 13/016,950, dated Jun. 5, 2013.
Notice of Allowance from U.S. Appl. No. 13/485,760, dated Jul. 16, 2013.
Notice of Allowance from U.S. Appl. No. 13/485,772, dated Jun. 12, 2013.
Notice of Allowance from U.S. Appl. No. 13/485,782, dated Jun. 17, 2013.

* cited by examiner

| | Transport | Authentication | Push Certificate | Message Size |
|---|---|---|---|---|
| Post | X | X | | X |
| Poll | X | X | | |
| Poll Delivery | X | X | | |
| Push | X | | | X |
| Delivery | | | | |
| Push Response | X | | X | X |
| Sync | X | X | X | X |
| Routing | merge | merge | merge | |

Fig. 11

|  | Connection Scope | Call Scope | Combined Policy |
|---|---|---|---|
| Post | X |  |  |
| Poll | X | X |  |
| Poll Delivery |  | X | X |
| Push Delivery | X | X | X |
| Push Response | X |  |  |
| Sync | X | X | X |
| Routing |  |  | X |

Fig. 12

METHOD, SYSTEM, AND COMPUTER PROGRAM PRODUCT FOR FACILITATING COMMUNICATION IN AN INTEROPERABILITY NETWORK

RELATED APPLICATION DATA

The present application is a continuation of U.S. application Ser. No. 12/775,394 for METHOD, SYSTEM, AND COMPUTER PROGRAM PRODUCT FOR FACILITATING COMMUNICATION IN AN INTEROPERABILITY NETWORK filed on May 6, 2010, which, in turn, is a continuation of U.S. application Ser. No. 10/858,709 for POLICY MANAGEMENT IN AN INTEROPERABILITY NETWORK filed on Jun. 1, 2004, which, in turn, claims priority under 35 U.S.C. 119(e) to U.S. Provisional Patent Application No. 60/511,573 for APPARATUS AND METHODS FOR POLICY MANAGEMENT WITHIN A COMPUTER NETWORK filed on Oct. 14, 2003, the entire disclosures of which are incorporated herein by reference for all purposes. The present application is also related to U.S. patent application Ser. No. 09/820,964 for SYSTEM AND METHOD FOR MAPPING OF SERVICES filed on Mar. 30, 2001, U.S. patent application Ser. No. 09/820,965 for SYSTEM AND METHOD FOR INVOCATION OF SERVICES filed Mar. 30, 2001, U.S. patent application Ser. No. 09/820,966 for SYSTEM AND METHOD FOR ROUTING MESSAGES BETWEEN APPLICATIONS filed Mar. 30, 2001, U.S. patent application Ser. No. 10/727,089 for APPARATUS AND METHODS FOR PROVISIONING SERVICES filed Dec. 2, 2003, U.S. patent application Ser. No. 10/728,356 for APPARATUS AND METHODS FOR CORRELATING MESSAGES SENT BETWEEN SERVICES filed Dec. 3, 2003, and U.S. patent application Ser. No. 10/742,513 for APPARATUS AND METHODS FOR MEDIATING MESSAGES filed Dec. 19, 2003, the entire disclosures of all of which are incorporated herein by reference for all purposes.

BACKGROUND OF THE INVENTION

The present invention relates to techniques for providing interoperability between and among disparate entities, applications and services in a network environment. More specifically, embodiments of the invention provide policy management techniques which facilitate such interoperability despite differing policies associated with the different entities, applications services.

Network communications between different enterprises are typically handled using ad hoc solutions. That is, if two enterprises want to communicate efficiently over the Internet, one will typically have to conform to the requirements of the other. Such requirements may relate, for example, to network communication protocols (e.g., FTP vs. HTTP), or to higher level policy issues (e.g., encryption).

WS-Policy allows providers of web services to define policies for anyone wanting access to their services. A web service provider publishes a WS-Policy description of a service (e.g., on its web site) so that potential consumers of the service can determine whether they are going to be able to consume the service or not. Thus, consumers of such web services are forced to conform to the policies of the service provider, regardless of their own technology or policy constraints. Given the number of partners or customers with which the typical enterprise would like or is required to communicate, such ad hoc approaches are simply no longer practicable.

SUMMARY OF THE INVENTION

According to the present invention, an interoperability network is provided which not only mediates technology issues between disparate entities communicating via the network, but also provides techniques for managing differences between the policies associated with such entities. According to a specific embodiment, an interoperability network and associated methods are provided for facilitating communication among a plurality of entities. Each entity has policy data corresponding thereto governing interaction with the entity via the interoperability network. At least one data store has the policy data for all of the entities stored therein. At least one computing device is operable to handle a message in the network with reference to first policy data corresponding to a first one of the entities to which the message relates. The at least one computing device is further operable to combine the first policy data with second policy data corresponding to a second one of the entities to which the message relates thereby resulting in first combined policy data. The at least one computing device is further operable to handle the message in the network with reference to the first combined policy data.

According to various specific embodiments, computer-implemented methods are provided for facilitating communication among a plurality of entities via an interoperability network. Each entity has policy data corresponding thereto governing interaction with the entity via the interoperability network. A message from a first one of the entities is transmitted to a second one of the entities. The first entity has first policy data corresponding thereto and the second entity has second policy data corresponding thereto. The transmitted message was handled in the network according to combined policy data representing a combination of the first and second policy data.

A further understanding of the nature and advantages of the present invention may be realized by reference to the remaining portions of the specification and the drawings.

BRIEF DESCRIPTION OF THE DRAWINGS

FIGS. 11 and 12 are tables illustrating policy enforcement according to specific embodiments of the invention.

DETAILED DESCRIPTION OF SPECIFIC EMBODIMENTS

Figure 1:
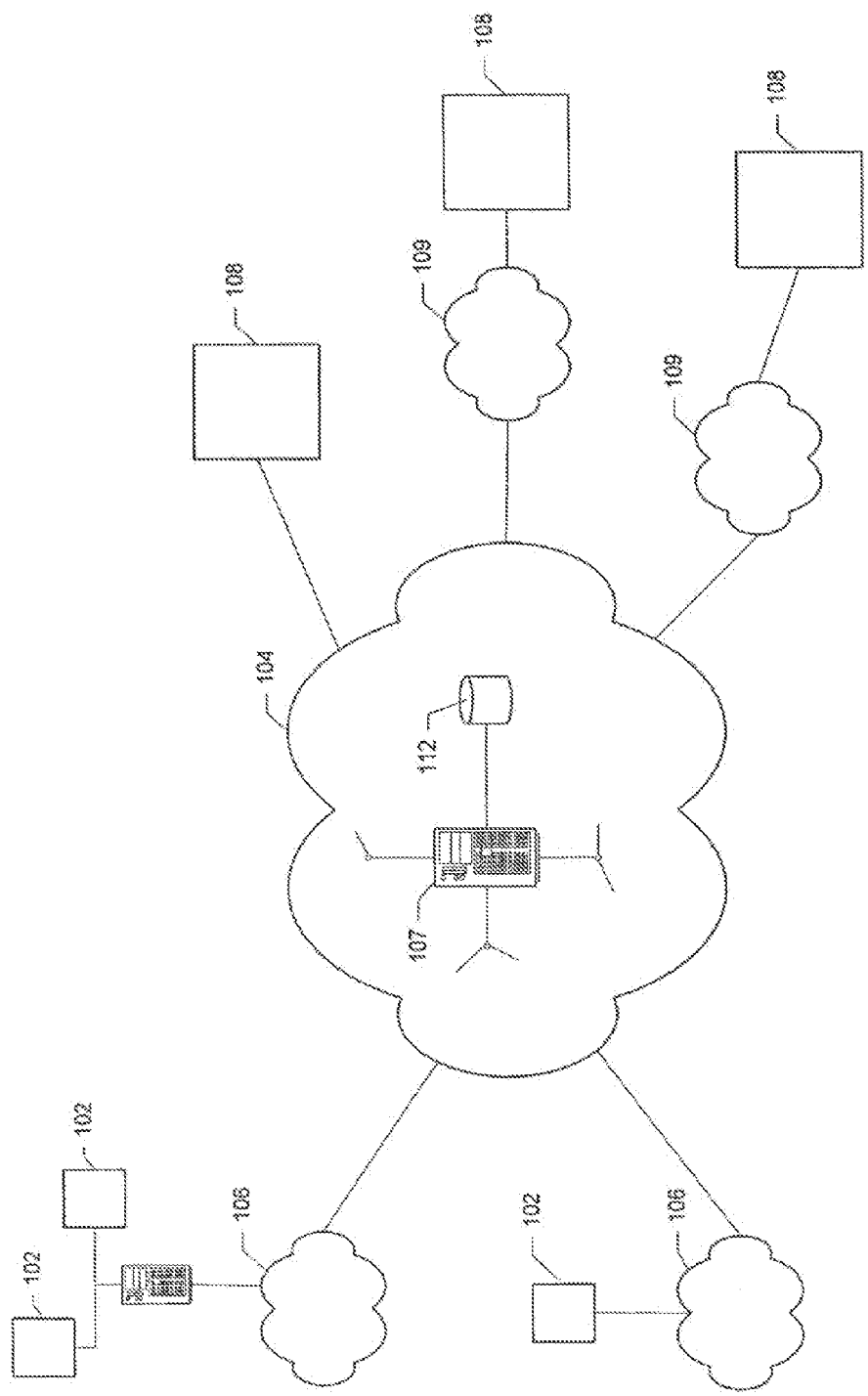
FIG. 1 is a simplified network diagram of a network environment in which embodiments of the present invention may be practiced.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention are implemented in an interoperability network which is a message platform having a loosely coupled, service oriented architecture (SOA). One of the main advantages of such an architecture is that it allows communication (e.g., the consumption of services) between network end points and processes to transcend technology or protocol mediation issues. An end point, e.g., a user, or a process, e.g., a service, simply connects to the network and that one connection implicitly connects that end point or process (at some level) to every other entity on the network.

As used herein, the term "service" may represent any computer application, process, entity, or device accessible to other applications, processes, entities, or devices through an interface such as an application programming interface (API), user interface, or Internet web user interface by any of a variety of protocols over a network within an entity or over the Internet. A service may also comprise multiple methods or applications on a single device or distributed across multiple devices.

According to various specific embodiments of the invention, an interoperability network is provided which facilitates interoperability using a wide variety of Web Services technologies and standards including, for example, SOAP, Web Services Description Language (WSDL), WS-Security, WS-Policy, and Business Process Execution Language (BPEL). The interoperability network mediates the technology differences in data formats, communications protocols and business policies through a set of established and defined processes and policies.

In general, the term Web Services refers to a collection of technology standards which enable software applications of all types to communicate over a network. A Web Service typically facilitates a connection between two applications or services in which queries and responses are exchanged in XML over HTTP. More specifically, the term Web Services implies the implementation of a stack of specific, complementary standards.

Although not specifically tied to any transport protocol, Web services build on Internet connectivity and infrastructure to ensure nearly universal reach and support. In particular, Web services take advantage of HTTP, the same connection protocol used by Web servers and browsers. XML is a widely accepted format for exchanging data and its corresponding semantics. It is a fundamental building block for nearly every other layer in the Web Services stack.

The Simple Object Access Protocol (SOAP) is a protocol for messaging between applications. It is based on XML and uses common Internet transport protocols like HTTP to carry its data. Web Services Description Language (WSDL) is an XML-based description of how to connect to and communicate with a particular Web service. A WSDL description abstracts a particular service's various connection and messaging protocols into a high-level bundle and forms a key element of the UDDI directory's service discovery model. Finally, Universal Description, Discovery, and Integration (UDDI) represents a set of protocols and a public directory for the registration and real-time lookup of Web services and other business processes. Various embodiments of the invention employ these and similar technologies.

Referring now to the exemplary diagram of FIG. 1, user platforms 102 (which may be part of an enterprise network) connect with a interoperability network 104 via intervening networks 106. Interoperability network 104 (e.g., using one or more computing devices such as server 107) facilitates access to selected ones of associated services 108 which may be sponsored or provided by network 104, or may comprise application services from third parties. These services may actually reside in the network or be connected via intervening networks (e.g., 109). As mentioned above, network 104 provides transparent connections to and interoperability with a wide variety of services and applications. Interoperability network 104 has a directory capability (represented by database 112) which facilitates management of user identities (e.g., including role and group membership), application service identities, and policies which control which entities in the network can interact, and the manner in which they can interact.

According to some implementations, the interoperability network employs the directory to manage interactions among the services associated with many independent organizations, each with different access, authentication and encryption technologies. Differences in organizational security policies are handled using a policy framework which mediates the differences. According to some embodiments, each organization is able to configure and enforce access rights with multiple methods of authentication being supported.

According to some implementations, the interoperability network supports WS-Policy, a flexible mechanism which enables enterprises to govern access to the services they have deployed on the interoperability network. Such a mechanism may be employed, for example, to ensure that data are exchanged over encrypted connections to the interoperability network, that user and service identities are verified (using the directory), and that access to a particular service is limited and controlled. According to various implementations, such capabilities are supported using industry standards such as, for example, SSL, IPSEC VPNs, and X.509 digital certificates.

Thus, interoperability network 104 provides a hosted, open, and shareable environment in which related and unrelated entities may provide and consume services using heterogeneous technology.

One approach to facilitating connection to and the consumption of services via such an interoperability network involves separating the messaging function into two different aspects, message delivery and message posting. Message delivery relates to how messages are delivered from the network to a service and requires only that the service provider specify how the service expects to receive messages, i.e., the message format and communication protocol. Message posting relates to how, depending on its type, a service is required to post messages to the network and identify services to be consumed. By decoupling these two aspects of messaging, a consumer of a service need only be able to identify the service to be consumed for the network to successfully mediate the interaction.

Additional examples of computer networks in which the techniques of the present invention may be implemented are described in the copending patent applications incorporated herein by reference above. However, it should be understood that the networks described herein and in these copending applications are merely exemplary and not meant to limit the scope of the present invention.

The present invention is generally related to techniques for policy management within a computer network such as, for example, the interoperability network described above or the networks described in the above-referenced patent applications. Several of these embodiments are described below as being implemented within an interoperability network referred to as "Grand Central." Grand Central is an interoperability network which allows users to set up or register multiple entities to share information, applications, and services efficiently and reliably. It should be noted that the details relating to the Grand Central network referred to herein are not intended to limit the scope of the invention. Rather, any suitable interoperability network may be enhanced according to the techniques described herein.

As referred to herein, a "policy" is a set of one or more "policy assertions" or rules which impose restrictions on the way in which entities are allowed to interact via the interoperability network. Policy assertions are typically static and are evaluated or proved at run-time as associated messages flow through the network. These policy assertions may correspond to properties of the messages being sent between entities, or properties of the entities themselves. For example, a policy assertion may require that a message have a certain type of encryption or be smaller than a threshold size. Alternatively, a policy assertion might require that an entity attempting to interact with a service have a particular credit rating, or a certain type of service level agreement (SLA) in place with the entity offering the service. According to various embodiments, policies may be bound to a variety of entities or components associated with the interoperability network including, but not limited to a message, an end point, a service, an enterprise, an individual or role within an enterprise, etc.

The policies associated with a particular entity are represented by a policy tree (e.g., a Boolean logic tree) which incorporates the policies or policy assertions configured by a representative of the entity. The policy tree is associated with a message as metadata when the message is received by the network.

The types of restrictions which may be imposed by a policy are quite diverse. For example, a policy may impose security restrictions such as for example, requiring encryption or certificate authentication. A policy may also impose restrictions on the format of a message such as, for example, message size or encoding. Such format restrictions may be over and above what is handled by the specific interfaces (e.g., HTTP, FTP, etc.) selected by the enterprise to interact with the network. According to some embodiment, however, even such basic technology mediation issues may be restricted by appropriately configured policies. For example, an enterprise could specify that it doesn't want its data to be transmitted to any of its partners via FTP. As discussed above, a policy may require that an entity have certain characteristics such as, for example, a specific SLA, credit rating, technical reliability, etc. It should be understood that the foregoing examples should not be used to limit the types of restrictions to which a policy may correspond.

According to various embodiments, a user may set up various policies associated with registered entities to enable those entities, services, applications, etc. to work in partnership through Grand Central. Policies may also be preconfigured within Grand Central. Several techniques and systems for registering entities, services, applications, etc. are described in detail in the above referenced patent applications. Policies may be associated with any communication component in the network, e.g., one or more end node entities, a user, an application, a service, a route, a routing program, etc. For example, when a service is registered with Grand Central for use by particular partnered end node entities, a particular policy may be specified for the registered service. Such a policy may define, for example, a level of security required for messages received by the registered service. Other types of policies may specify rules for any suitable characteristics or behavior of any number and types of entities, such as routes, routing rules, users, messages, users, etc. In another example, a user profile may be set up as an authentication policy for a particular end node entity or set of end node entities or users.

A policy or set of policies may be specified using any suitable interface. According to some embodiments, policies may be selected from a fixed set of predefined policies. For example, a user may select from a list of predefined policies via a pull-down menu, buttons, checkboxes, etc., which are presented to the user in a graphical user interface when registering a service. After the user selects one or more policies for a particular service, the policy selections may then be saved within a data structure, e.g., a policy tree, associated with the service which is accessible by Grand Central. In another example, a service can specify a policy to Grand Central as a part of a message in situations where the specified policy is to be applied relative to that message (rather than for all messages to or from that service).

Once set up, the policies may be accessed by Grand Central and used to evaluate policy assertions for particular services. The run-time evaluation of policy assertions (also referred to herein as "proofs") occur at various points in the network and in response to particular trigger events such as, for example, connection to Grand Central, message transmission to Grand Central, message transmission from Grand Central, routing of a message, etc.

According to specific embodiments, the task of checking and enforcing policies is distributed throughout the interoperability network with different portions or policy assertions within a policy tree being checked depending on the network context. For example, a policy assertion requiring connection with the network using encryption may be checked at the edge of the network, i.e., where the connections are being made, but not at end points which are completely internal to the network, e.g., an end point corresponding to a virtual service located in the network. On the other hand, a policy assertion imposing a maximum message size may be checked at various points in the network because of the fact that the message size may change as it propagates through the network.

According to a specific embodiment, each network component is responsible for checking and enforcing a certain subset of the available policy assertions. Each such network component only evaluates the policy assertions within a policy tree associated with a particular message for which it is responsible. When a new policy assertion option is added to the network, code for checking and enforcing the new policy assertion is added to an appropriate component within the network. For example, if the interoperability network were to provide a dedicated communication line between a large enterprise and the network's data center, a policy assertion could be constructed which enforces the policy that any communication from that enterprise must be received on a dedicated line. New code could then be incorporated into all components receiving communications from outside of the network to enforce the new policy assertion, i.e., to reject any communications from the enterprise unless received on a dedicated line.

Figure 2:
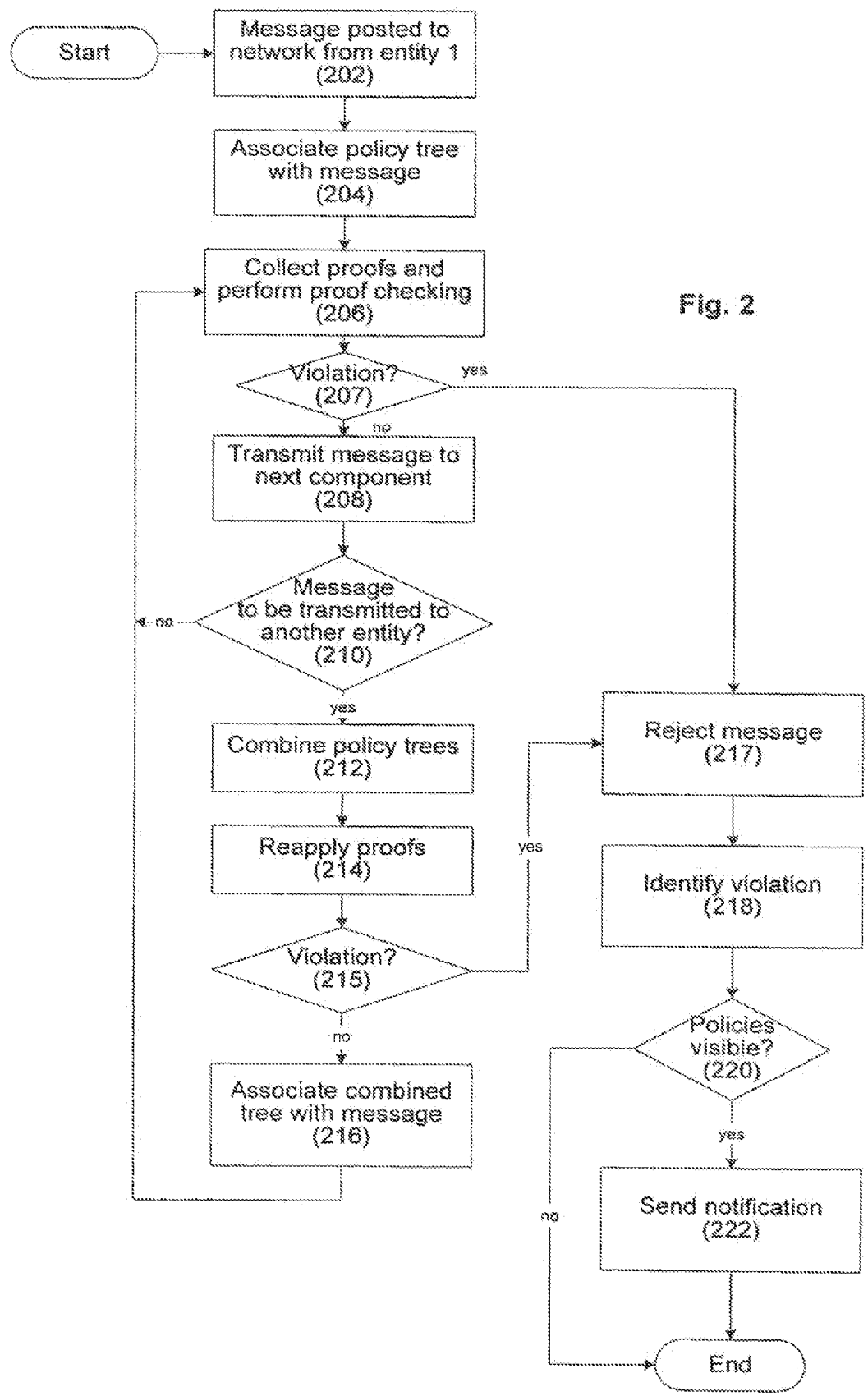
FIG. 2 is a flowchart illustrating policy management in an interoperability network according to a specific embodiment of the invention.

As mentioned above and as illustrated in the flowchart of FIG. 2, when a message from a particular entity is posted to the network (202), the policy tree associated with the entity is associated with the message (204) and any policy assertion checking for which the receiving network component is responsible is performed, i.e., proofs of the policy assertions are collected and checked (206). If there is a policy violation (207), the message is rejected (217). As the message flows through the network and is received by each successive network component (208), a historical record of the evaluation of policy assertions is recorded in metadata, i.e., the policy tree, associated with the message, proofs of the policy assertions are added to the policy tree. According to a specific embodiment, the policy tree may be, for example, a Java tree which is serialized and associated with the message. Thus, as discussed above, policy enforcement is distributed along the path followed by the message in the network.

According to various embodiments of the invention, when it is determined at some point in the network that a message from one entity is to be transmitted to one or more other entities (210), the policy trees associated with the different entities are logically combined into a single policy tree which is a union of the different policy trees (212). The proofs are then reapplied to the policy assertions in the combined policy (214). That is, each time policy trees are combined, the previously run proofs are re-run to verify they are still valid. If no policy violations are detected (215), the combined policy tree then accompanies the message in the network (216) to facilitate interaction between or among the different entities.

In some cases, the combination of policies may not be possible, e.g., they are mutually exclusive to each other in some aspect. According to a specific embodiment, such policy violations are identified at run time, i.e., as proofs of policy assertions are being made at various points in the network. According to an alternate embodiment, policy trees from different entities who wish to interact in the network, e.g., business partners, may be checked for mutual exclusivity at some point before run time.

According to a specific embodiment, when such a policy violation occurs (215), the message is rejected (217), and the portion, i.e., policy assertions, of the policy tree(s) to which the violation corresponds is identified (218). And, depending on the visibility of the policy tree in the network (220), a notification may be sent to the entity violating the policy or the entity to which the policy corresponds (222). For example, if a policy requires that anyone attempting to access a service connects to the network using HTTPs, a user attempting to access the service using HTTP would be so notified. In addition, the entity setting the policy may be notified that an access attempt failed.

In general, a wide variety of actions may be taken by the network in response to a policy violation of any type. For example, the message causing a policy violation may simply be bounced back to the sender. If the policies are visible within the network, some information regarding the nature of the policy violation may also be transmitted to the sender. In addition, alerts to the entity associated with the policy being violated may also be generated. Such alerts may be useful, for example, to let the provider of a service on the network know if its policy is too restrictive. In some embodiments, the message may be forwarded to a help center web site associated with one of the entities involved in the communication.

According to specific embodiments, the scope of a policy may vary. That is, policies may be designated as applying to a session, a call, or a connection. A SessionScope policy, i.e., a policy having a session level scope, represents the most persistent types of restrictions, and provides a way for all parties involved in a long-lived transaction or an extended messaging conversation to ensure their policies are applied appropriately to the entire session. As will be discussed, a SessionScope policy may be achieved by extending a CallScope policy.

A CallScope policy represents the type of restrictions that a service or entity wishes to impose on itself and others, e.g., an external corporate policy that applies to interservice interaction. A CallScope policy typically applies to one message transmitted between two entities on the network, e.g., a request response pair, or a notification. As mentioned above, a CallScope policy may be extended to cover entire sessions.

A ConnectionScope policy represents the type of restrictions that a service wishes to impose on itself, e.g., an internal corporate policy that applies only to connections to and from the interfaces of the interoperability network.

Although the present invention is described below with respect to specific messaging protocols, of course, any suitable protocol may be implemented. Additionally, policy examples are described below as being formatted in XML or the WS Policy type format. This representation is merely for ease of understanding and should not be interpreted as limiting the representational format of the policies to XML or the WS Policy format. Of course, any suitable format may be utilized to select and store a policy. In fact, the same format may not be necessarily used to select and store each policy. Also, the policy types described below are merely exemplary and are not meant to limit the scope of the invention.

The representations and types of policies presented by Grand Central need not be identical for all users and services. Grand Central may establish mappings between policies as configured by one entity and the policies as configured by another entity. For example, a policy of "password authentication" may be considered under some circumstances to be an accepted generalization of a policy defining specific protocols and methods of password authentication. Grand Central may maintain internal mappings between policy types, or may reduce all policies to an internally maintained representation and set of types. Such mappings may be particularly advantageous in facilitating the logical combination of disparate policies associated with different entities.

The services which are pictorially represented in the accompanying figures (where a circle represents a particular service) represent Grand Central's proxy for each service. That is, in the illustrated implementations Grand Central maintains a set of characteristics for each service, including the policies for each service. In some figures, the connection between the actual service and Grand Central is explicit—shown as labeled arrows indicating the interface (push, post, etc.)—while in other cases the connection is implicit. Therefore, it should be understood that the circle may, without loss of generality, represent either the service itself or Grand Central's proxy for the service.

It should also be noted that any of the features specified in the above referenced patent applications may be integrated and used with the techniques of the present invention. For instance, one or more of the service registration and management techniques described may be combined with the policy management techniques described herein. In a specific service example, policy management is described herein with respect to routing programs. One or more of the routing embodiments described in the above-referenced applications (e.g., routing scripts, routing rules, message router components, routing instructions, route calculations, and routing specification) may also be combined with the routing programs described herein and the policy management techniques described herein may then be applied to such routing embodiments.

The description below with reference to FIGS. 4-23 generally describes policy assertion examples and mechanisms for evaluating policy assertions to establish proofs of such assertions. An extension of these examples is to enable Grand Central to accept assertion proofs from trusted services and include those proofs in the evaluation of a policy. For example, one may suppose Service A has a policy on the operating system other services run on. One can also suppose Service B interacts with service A through Grand Central. Grand Central cannot directly prove which operating system Service B uses, but if a trust relationship exists between Service B and Grand Central, or between Service B and Service A, then Grand Central could accept an assertion from Service B and apply it to Service A's policy as if Grand Central had established the proof. As with any policy, the assertion from Service B could be part of the configured policy stored by Grand Central for Service B, or the assertion may be transmitted as part of a message from Service B.

The description below also describes policy management mechanisms implemented within Grand Central with respect to calls which follow a sequential call order. Although most of the examples illustrate policies between two services, Grand Central is preferably also configured to manage policies among multiple entities, particularly where the evaluation of policies between two entities may incorporate the results of prior policy evaluation between those or other entities.

Figure 3:
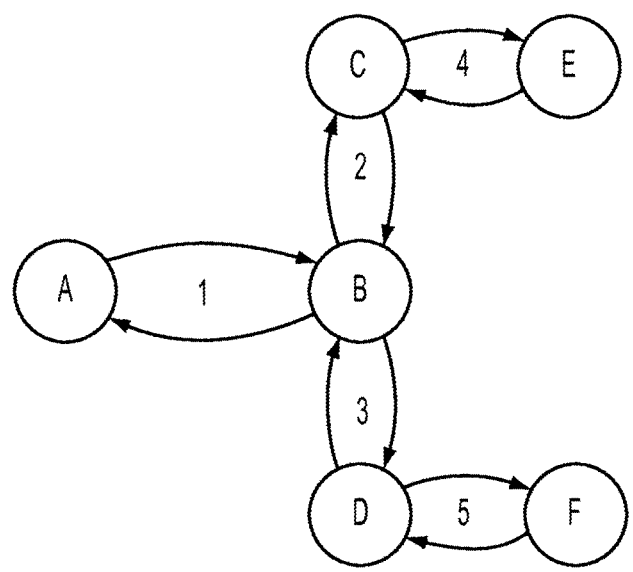
FIG. 3 is a diagram illustrating policy management involving a plurality of services according to a specific embodiment of the invention.

The described policy management embodiments may also be easily applied to calls or messages which follow a "forked" path as shown in FIG. 3. In such a forked policy context, policy contexts of the parallel paths are derived from a common policy context at a "forking" node from which branched paths emanate (e.g., node B), but fork into independent policy contexts on pathways or endpoints which are located on branches with respect to the "forking" node (e.g., nodes C, D, E, and F). Thus, the policy trees being evaluated and the contexts in which they are evaluated evolve as the associated message propagates through the network.

An example session which forks into parallel concurrent tracks of calls is illustrated in the FIG. 3. As shown, service B invokes services C and D in substantially concurrent fashion. Service C invokes service E at some point after returning a response to B; similarly service D invokes service F at some point after returning a response to B. Thus, the calls to E and F occur independently of each other. Various approaches to policy enforcement may be set up with respect to a forked session. For instance, it may be determined whether attributes of the call from service C to service E affect policy enforcement in the call from service D to service F.

Policy auditing mechanisms may also be incorporated with the policy management techniques described herein. That is, the historical record of policy assertions maintained in the policy tree may be recorded such that at a later date the particulars of the policy evaluations (and the specific policy proofs established) can be audited. Such auditing could be useful, for example, to verify compliance with a SLA, and may be provided as a service of Grand Central through a suitable interface. Other examples of uses of the historical record of policy assertion evaluation include, but are not limited to, troubleshooting, debugging, and intrusion detection.

In addition to the policy management mechanisms described herein, Grand Central can act as a repository for policies such that services can make requests to Grand Central to retrieve the policies of partners. This would enable users to examine policies to make sure they will be able to comply before actually sending messages. Furthermore, Grand Central can support policies on the visibility of policies—not only to restrict visibility but also to enable organizations to have a policy that they only exchange messages with services that have public policies.

Beyond the security assertions and message characteristic assertions described herein, Grand Central may also be configured to support other types of assertions, such as, but not limited to, policies on protocols, service configurations, and SLAs (service level agreements). For example, Organization A could have a policy that it will message only with services that have an uptime of at least 99.99% or that it will message only with services that have returned errors in less than 1% of exchanges. By virtue of Grand Central's role in managing service invocations, Grand Central is able to monitor services and therefore enforce policies relative to service levels.

Specific examples of policies, policy assertions, and policy evaluations will now be described with reference to FIGS. 4-23. It will be understood that the policies and policy assertions described are merely exemplary and should not be used to limit the scope of the invention. The techniques of the present invention are applicable to a much broader array of possible policies and assertions.

Figure 4:
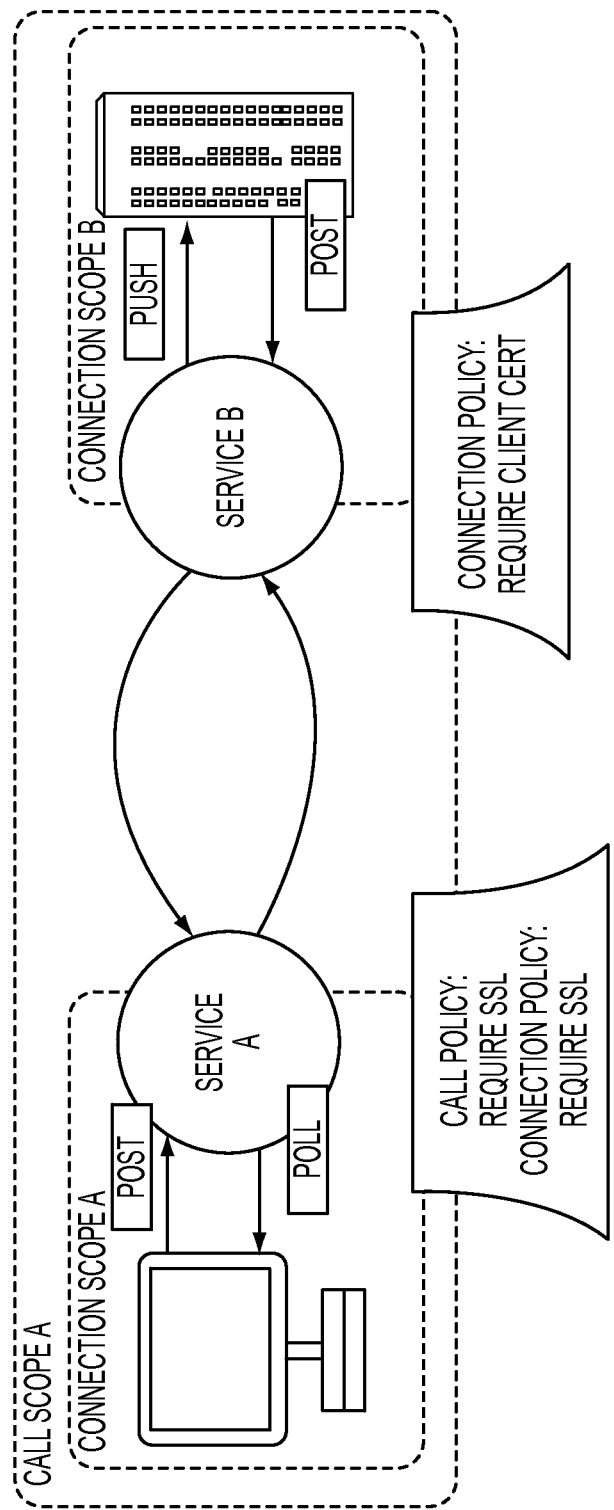
FIGS. 4-10 are process flow diagrams illustrating operation of specific embodiments of the invention.

In the example of FIG. 4, Service A declares a Call Scope policy in addition to its Connection Scope policy. The Call Scope policy of Service A requires Service B to perform all communication to Grand Central using SSL, even though B's Connection Scope policy does not require SSL. If Service B posts a response message over HTTP, a routing policy violation occurs, the message will be dropped, and a SOAP fault returned to the original sender of the message (Service A).

Figure 5:
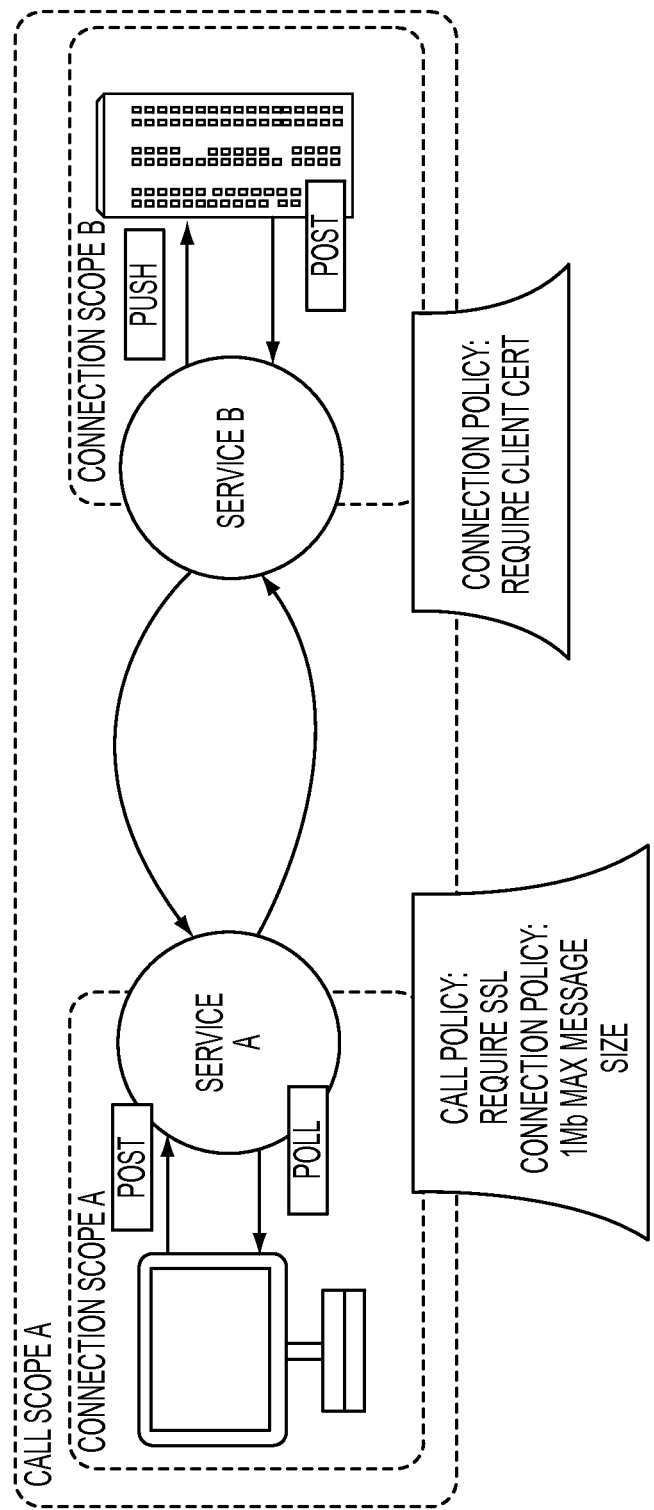

The example of FIG. 5 illustrates how distinct ConnectionScope and CallScope policies allow an organization to place one set of restrictions on the way it connects to Grand Central and a different set of restrictions on how it communicates with other services on the network. In the depicted example, Service A declares a Connection Scope policy that restricts the maximum message size it can post or receive. Service A also declares a Call Scope policy that restricts the connection to web services on the network to SSL only. Service B declares a Connection Scope policy that requires client certificate authentication. The combined Call Scope policy requires both participants in a call to meet an SSL requirement, while only Service A has a 1 Mb limit on message size, and only Service B needs to use a client certificate for authentication.

Figure 6:
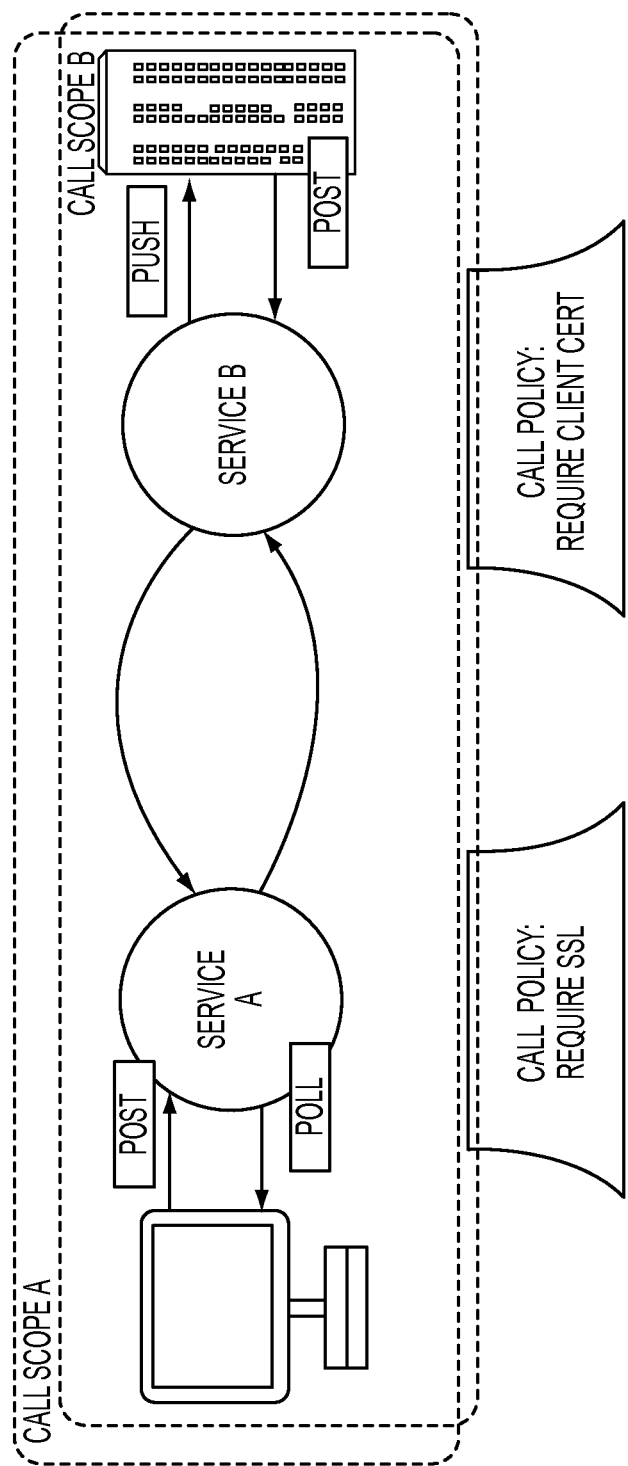

In the example of FIG. 6, both Service A and service B declare Call Scope policies. The Connection Scope policies are omitted to simplify the diagram. Both services must honor each other's policies. That is, in this example, they both must use SSL and authenticate to Grand Central with a client certificate. Thus, if Service A posts a message to Grand Central over HTTP rather than HTTPs (SSL), a post violation occurs and results in a post rejection and a synchronous SOAP fault. If Service A invokes a "getCatalog" method of poll API over HTTP, a poll API violation occurs and results in rejection of the getCatalog call. If Service B specifies a push URL containing the HTTP protocol rather than HTTPs, a push violation occurs and results in a delivery error and a SOAP fault returned to the sender of the message. If Service A invokes a "getCatalog" method of poll API and authenticates using a password, a poll delivery violation occurs and results in a delivery error. If Service A posts a message to the network and authenticates using a password, a routing policy violation occurs and results in a routing error and a SOAP fault returned to Service A asynchronously.

Figure 7:
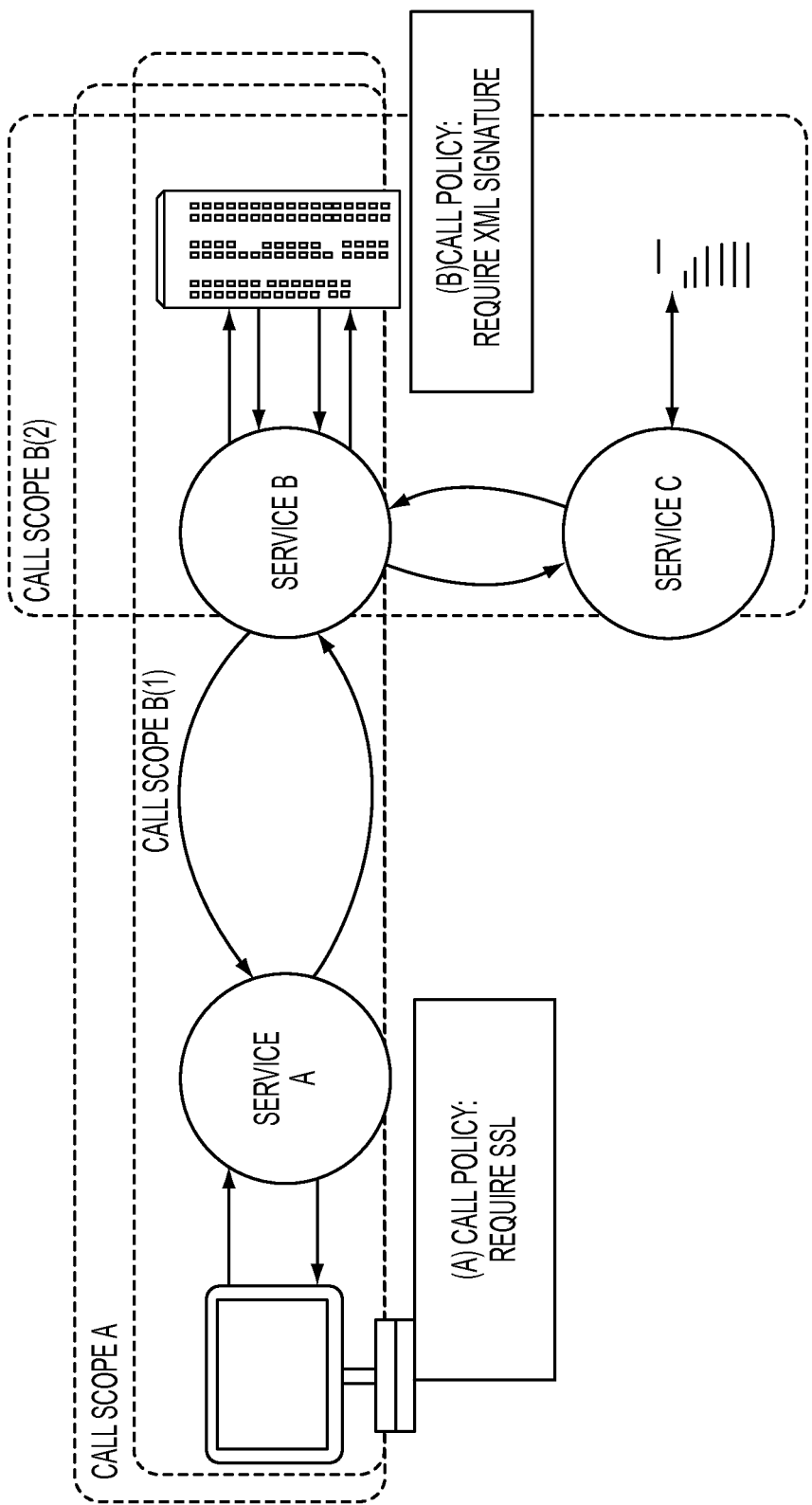

The Call Scope example of FIG. 7 shows Service B acting as an endpoint routing service. After receiving a message from Service A, Service B makes a call to Service C. Service B receives a response from C and posts a response for Service A. Service B has a Call Scope policy requiring XML signatures. Since B participates in message exchange with both A and C, all three need to meet the XML signatures requirement. Service A has an SSL policy requirement which applies to services A and B, but does not extend to service C (because service B did not extend service A's call policy). Service C does not have a policy. In this scenario, all of the policies are met if services A and B use SSL to connect to Grand Central, and all messages exchanged between A, B and C are digitally signed. On the other hand, a signature policy violation by Service C does not affect Service B's ability to return the response to Service A.

As discussed above, basic Call Scope policy enforcement typically applies to interaction between two services. PolicyExtensionByEndpoint (described below) provides a mechanism to enforce a policy over multiple calls.

Figure 8:
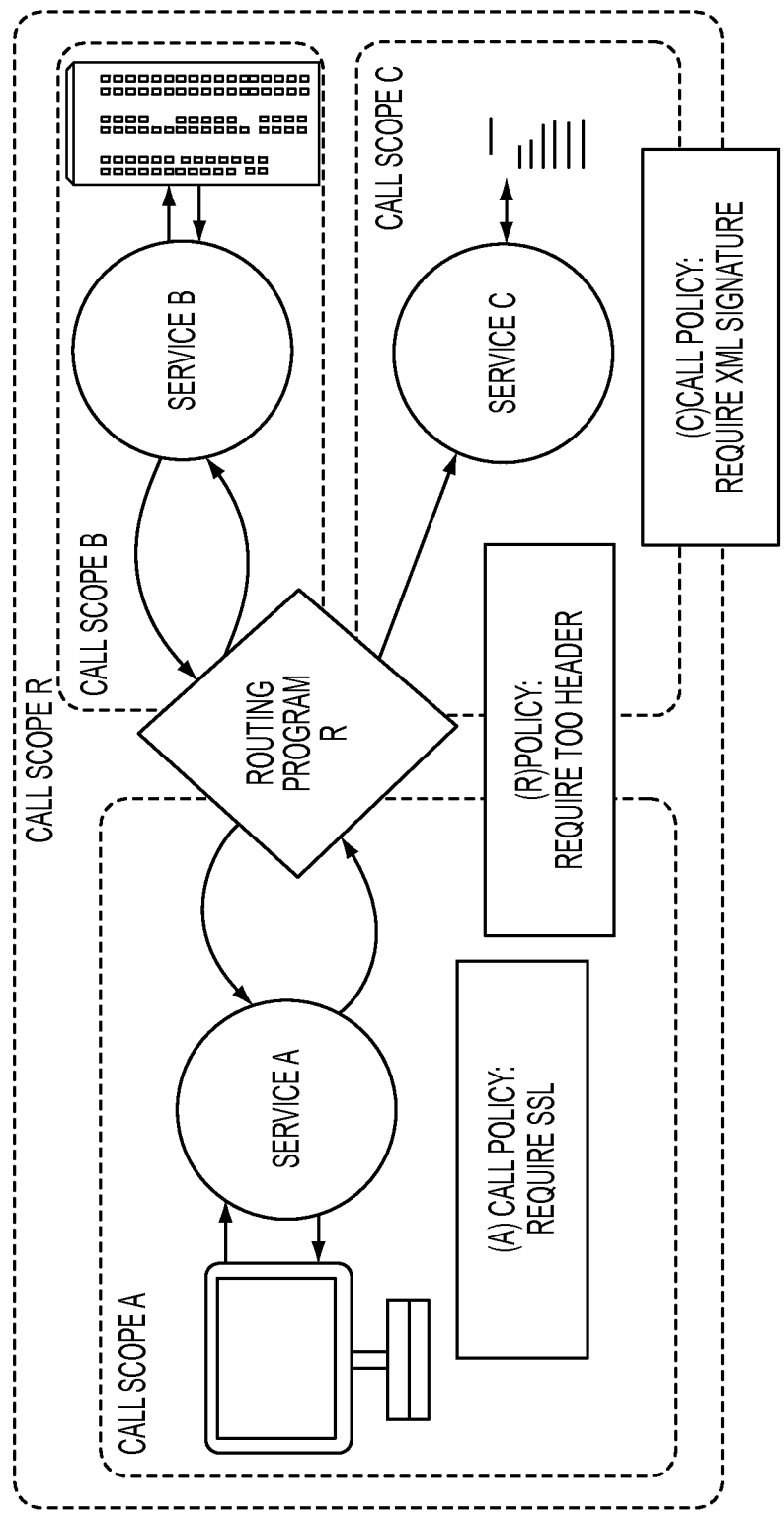

The example of FIG. 8 demonstrates how Call Scope changes when a message is addressed to a Grand Central routing program instead of an endpoint service. According to this embodiment, the Call Scope terminates at the point when a message enters the routing program. From a policy enforcement stand point, the routing program in this example is treated similarly as the endpoint service B in the example of FIG. 7. The routing program is capable of having its own policy which can be of Call Scope type only, since the routing program is within the network and therefore makes no connections to the network.

The policies are met when service A uses SSL to connect to Grand Central, messages to service C from routing program R are digitally signed, and all messages exchanged between A, B and C (through routing program R) have the header "foo". Call Scope policy enforcement in this example is limited to interaction between each service and the routing program. PolicyExtensionByRoutingPrograms (described below) provides a mechanism to enforce a service policy beyond the boundary of the routing program.

A CombinedPolicy is a policy that is a result of merged policies of two or more services. According to a specific embodiment, the capability of Grand Central to merge the CallScope policies of sending and destination services and to produce a combined policy that must be honored by both entities facilitates policy mediation. In addition, when PolicyExtension (described below) is performed, the CombinedPolicy of the message whose policy is being extended is merged as well. According to various embodiments, Grand Central is configured with algorithms that govern how to handle complex policies whose rules may compete or overlap. In one implementation, policies are combined as a union (or as an AND operation) of the policies. Redundant assertions may be pruned and conflicting assertions may be automatically evaluated as failed.

Figure 9:
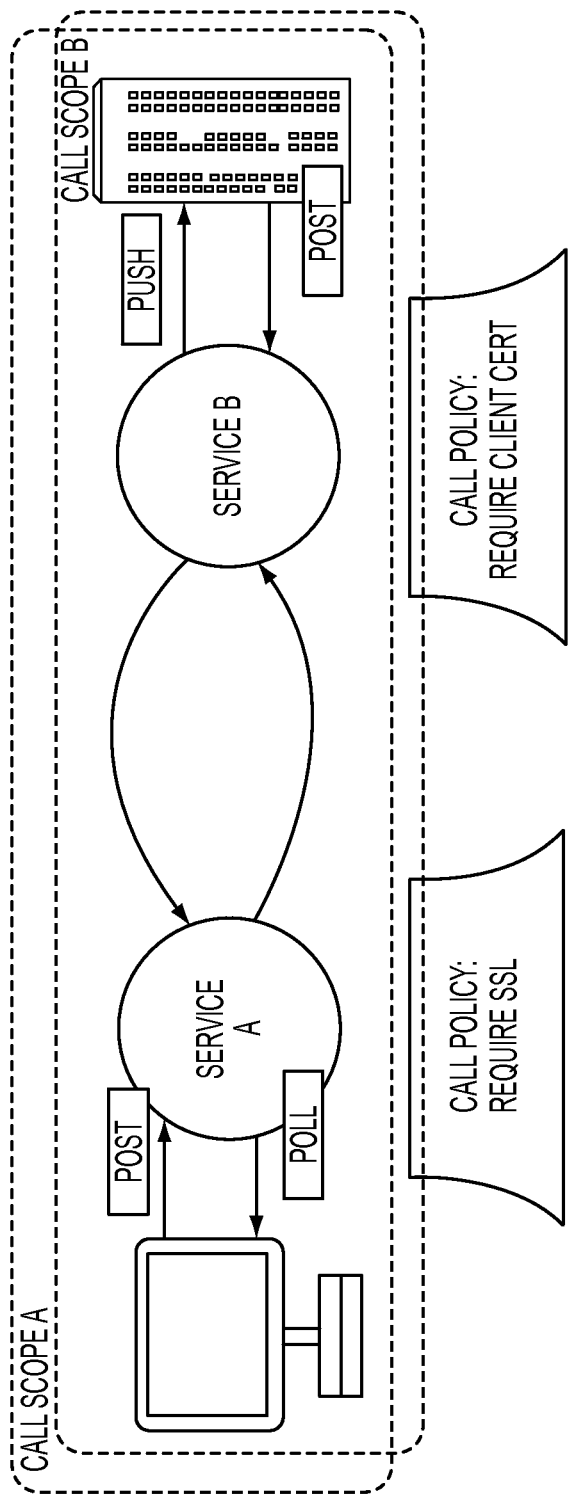

In the example of FIG. 9, both Service A and service B declare Call Scope policies. Service A requires an SSL connection, and Service B requires client certificate authentication. Therefore, the CombinedPolicy requires both the SSL connection and client certificate authentication. Failure of either Service A or B to meet the Combined Call Scope policy causes a policy violation.

As discussed above, a ConnectionScope is a policy scope that applies only to connections to and from Grand Central interfaces. A ConnectionScope policy typically represents the type of restrictions that a service or enterprise wishes to impose on itself. According to various embodiments, a ConnectionScope policy may be enforced by Grand Central messaging APIs, e.g., post, push, sync, getCatalog, getMessage, acknowledge.

Figure 10:
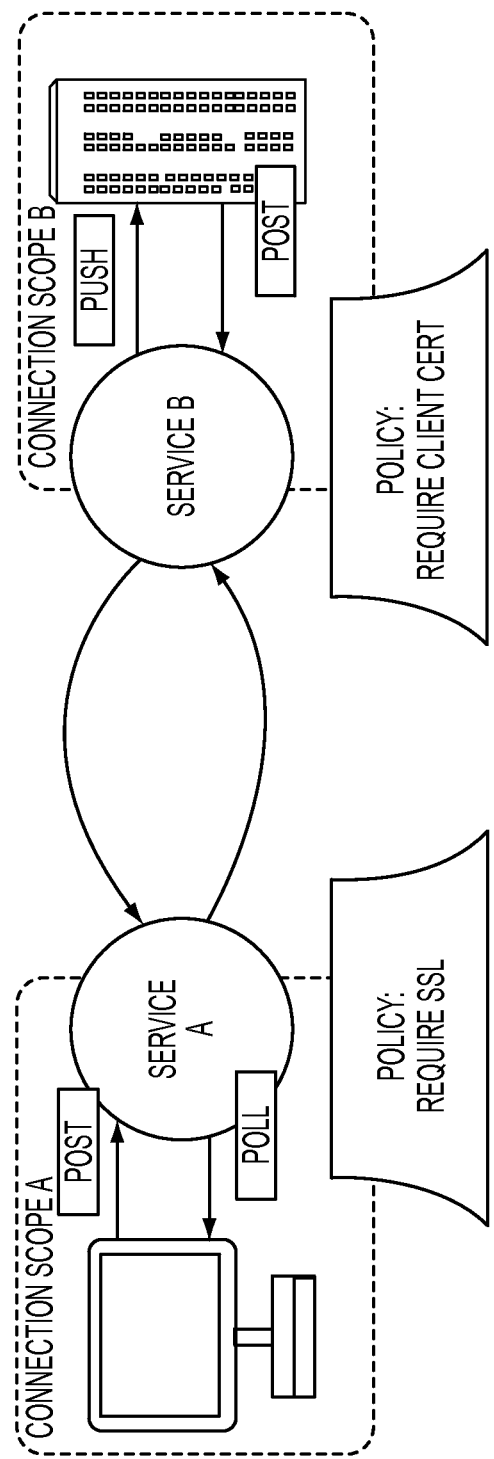

In the example of FIG. 10, Service A declares an SSL-only ConnectionScope policy and Service B declares a certificate authentication ConnectionScope policy. The ConnectionScope policy of Service A has no effect on how Service B chooses to connect to Grand Central, and vise versa. Messaging between A and B is possible as long as service A meets its own SSL requirement and service B meets its own certificate requirement. Thus, if Service A posts a message to Grand Central over HTTP, a post violation occurs and results in a post rejection and a synchronous SOAP fault. Similarly, if Service A invokes a "getCatalog" method of a poll API over HTTP, a poll API violation occurs and results in a rejection of the getCatalogcall. And, if a response message is posted by Service B using HTTP basic authentication, a post violation occurs, the response message is rejected, and a SOAP fault is returned to Service A because no response is accepted from Service B.

A MessageSizeAssertion may be used by a service to express the maximum size of messages it allows. This assertion applies to all connections to and from Grand Central on all interfaces. In a specific implementation, this assertion is applicable to ConnectionScope policies only. In one implementation, the syntax may be: <gc:MessageSizeAssertion Type="gc:Mb">int</gc:MessageSizeAssertion>
where value of assertion is a positive integer which specifies the maximum message size allowed (range from 1 to 50) measured in mega bytes. The assertion will evaluate to true if and only if the total message payload size does not exceed this value.

The And operator represents Boolean AND expression which requires that all its child elements be satisfied. This operator and may contain both policy assertions and policy operators as its children. It can be used to create an inclusive list of requirements that need to be satisfied. In one implementation, a representation of a policy using the And operator may be:

```
<And>
    <wsse:SecurityToken TokenType="wsse:UsernameToken" />
    <wsse:SecurityToken TokenType="wsse:X509v3" />
</And>
```

This policy fragment indicates that the associated service requires both certificate and password authentication. When both of them are proven to be true, the policy is satisfied. If only one is true, the policy is violated.

The ExclusiveOr operator represents Boolean XOR expression which requires that exactly one of its child elements be satisfied. This operator may contain both policy assertions and policy operators as its children. It can be used to establish equivalency between assertions, similar to the Or operator, but with the additional restriction that only one child can be satisfied. In one implementation, a representation of a policy using the ExclusiveOr operator may be:

```
<Xor>
    <wsse:SecurityToken TokenType="wsse:UsernameToken" />
    <wsse:SecurityToken TokenType="wsse:X509v3" />
</Xor>
```

This policy fragment indicates that the associated service requires either certificate or password authentication, but not both. If either one of them is proven to be true, the policy is satisfied. However if both or none of them are satisfied, then the policy is violated.

The operator Or represents a Boolean OR expression which requires that that at least one of its child elements be satisfied. This operator may contain both policy assertions and policy operators as its children. In some implementations, it can be used to establish equivalency between assertions. In one implementation, a representation of a policy using the Or operator may be:

```
<Or>
  <gc:TransportLevelSecurityAssertion Type="gc:ssl" />
  <gc:TransportLevelSecurityAssertion Type="gc:ipSec" />
</Or>
```

This Policy fragment indicates that the associated service requires either SSL or IPSEC VPN connections. It treats them as equivalents, so if either one of them is proven to be true, the policy is satisfied.

According to some embodiments, various usage qualifiers may be used in conjunction with policies and policy assertions. In some implementations, assertions may convey requirements, restrictions, preferences or capabilities of a service depending on the value of an associated usage qualifier, e.g., wsp:Usage from the WS-Policy specification. According to one implementation, in order to express those, and support traditional "Allow/Deny" policy constructs, the following three usage types are supported. "wsp:Required" (which indicates that a policy must be applied is the standard assertion, i.e., the default value in each assertion. "wsp:Rejected" is equivalent to applying a Boolean NOT to the assertion. For example to prohibit the use of SSL, the wsp:Usage value is set to "Rejected" for the SSL policy assertion. "wsp:Observed" is used to set the preference of a service with regard to whether or not the service is to be exposed. For example, the PolicyVisibilityAssertion is of the type "Observed."

According to a specific embodiment, policies may be specified using a policy language which includes a policy envelope, policy operators and policy assertions. The policy language is easily extensible by creating new assertions and/or supporting more values of existing assertions. It allows for expressions and mediation of complex policies through the use of operators.

As discussed above, Grand Central supports applications of policies that are defined using policy scopes ConnectionScope and CallScope. The ConnectionScope may be used by customers to express their corporate policies when messaging with Grand Central. The CallScope may be used to mediate external policies between services. CallScope policies can be extended indefinitely by services participating in message exchange.

Policies implemented within Grand Central can be used for expression and enforcement of connection security, authentication and authorization, message security and integrity, message format and size, message non-repudiation, "SLA" performance, availability, privacy and visibility, as well as other types of messaging behavior and characteristics of services.

PolicyEnforcementPoint is an evaluation that Grand Central performs on policies. The evaluation may be performed at interface points as well as a variety of other points in message routing or processing. Interfaces are generally different ways an entity (e.g., service) may connect to Grand Central (e.g., for posting or receiving a message).

According to various specific embodiments, Grand Central interfaces that may perform policy enforcement include Post, Poll, Poll Delivery, Push Delivery, Push response, Sync and Routing interfaces. The table of FIG. 11 identifies example interfaces that may be applicable for policy assertions described herein. The table shows which types of assertions may be evaluated when a message is sent or received via that interface. The table headings correspond to the following abbreviations: Transport=TransportLevelSecurityAssertion; Authentication=SecurityTokenAssertion; Push Certificate=ServerIdentityVerificationAssertion; and Message Size=MessageSizeAssertion.

The table of FIG. 12 identifies example interfaces that may perform evaluation of policies with different scopes. Policy enforcement may result in events being generated within Grand Central. These events may result in alerts (e.g., e-mails or messages) being sent to one or more services or users participating in the message exchange for which policy enforcement occurred. In one implementation, the alert contains details of the policy enforcement and the outcome of the enforcement (e.g., violation). In another embodiment, policy violations detected during policy enforcement cause error messages in the form of SOAP faults to be returned to the sender of a message for which policy enforcement failed.

According to specific embodiments, a service endpoint can extend a Call Scope policy of a message that was delivered to it using PolicyExtensionByEndpoint. In one implementation, a service may only extend the policy of a message if and only if the service is an intended recipient of the message and the message is already delivered to the service. A service is not allowed to extend the policy of a message it has posted to Grand Central. In addition, a service may not be allowed to extend the policy of a request message if it has already posted the response to the request message to Grand Central.

In one embodiment, the mechanism for extending a policy is the inclusion of a token in the header of a posted message to Grand Central where the token is taken from the header of a message received from Grand Central. In such a case, the token represents a link between the call whose policy is to be extended and the call into which the policy is to be extended. As would be appreciated, other mechanisms of linking calls for policy extension can be supported.

Figure 13:
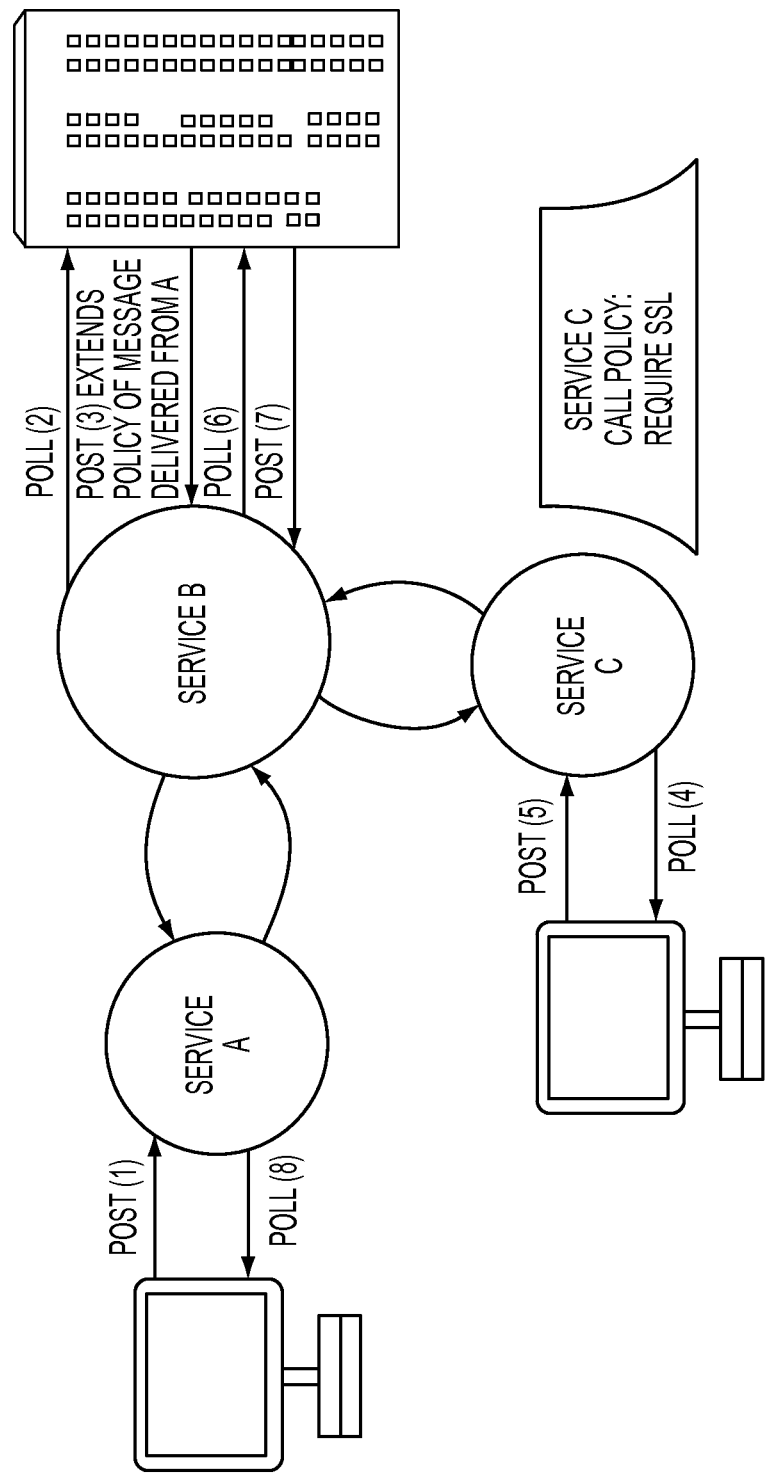
FIGS. 13-23 are process flow diagrams illustrating operation of specific embodiments of the invention.

The example of FIG. 13 illustrates the effect of policy extension on a message flow. In this example, Services A and B have no policies, and Service C has a policy of SSL only. Service B extends the CallScope Policy of Service A and sends a request message from Service B to service C. The arrows numbered as (3)-(8) indicate the connections that have to be made over SSL in order to comply with the policy of service C. Arrow 3 must use SSL because that arrow represents the post of a message addressed to Service C. In one embodiment, the enforcement of a policy obtained through policy extension is done downstream from the extension point only.

Figure 14:
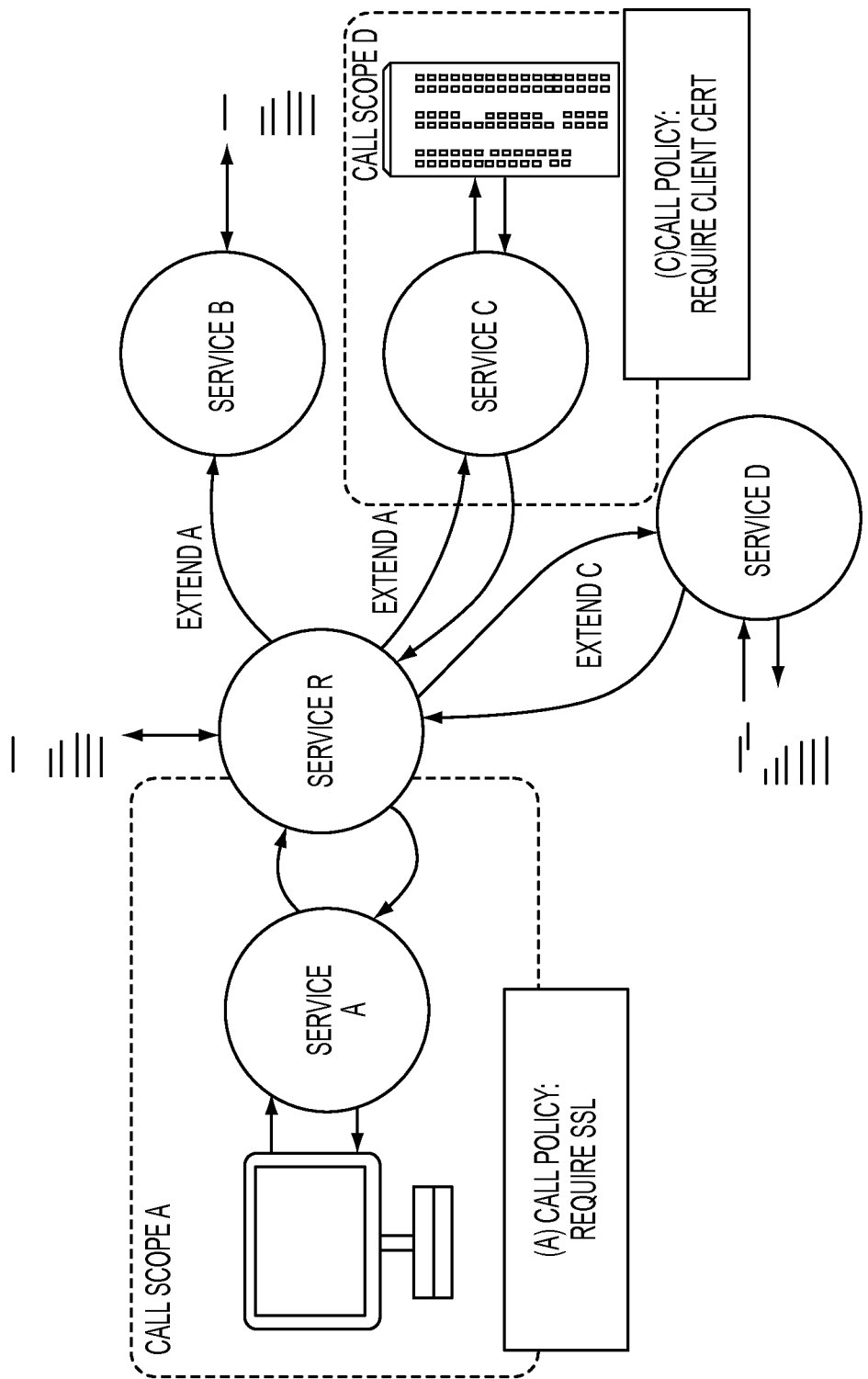

The example of FIG. 14 illustrates a more complex case of policy extension. Service R extends the CallScope Policy of Service A and sends a notification message from Service R to service B. Service R extends the CallScope of Service A and sends a request message from Service R to service C. Service R extends the CallScope Policy of Service C (which now includes CallScope Policy of Service A as well) and sends a request message from Service R to service D. Service R sends a response message from Service R to Service A.

In one implementation, the following conditions have to be satisfied in the course of a transaction among services A, R, B, C, and D. First, Services A, R, B, C and D must all use SSL to connect to Grand Central (defined in policy of Service A which they all extend). Services C and D must authenticate to Grand Central using client certificate (defined in policy of Service C which is extended into call to Service D). Services A and R must authenticate to Grand Central using client certificate for all the messaging done after Service C was invoked (because policy of C applies to downstream messaging). If Service R attempts to respond to Service A by using password authentication, routing of the response will fail. Service B may authenticate using password because it only extends policy of A and is on separate message pathway from Service C. If endpoint routing Service R attempts to extend the CallScope Policy of Service C by posting a message to D before the return from Service C is delivered to it, a PolicyExtension violation will occur.

Policy extension is a mechanism by which Grand Central is able to apply policies across complex message routing (such as non point-to-point routing). It is a way for all parties involved in a long-lived transaction or an extended messaging conversation to ensure their policies are applied appropriately to the entire session. One of the advantages of policy extension is that services can leverage the capabilities of Grand Central to combine and apply the policies of multiple other services in an extended conversation. This allows a simple service to implement very powerful policy enforcement without that service needing to do it itself (i.e., Grand Central manages it).

The example of FIG. 14 also illustrates how "forking of policy context" may occur in policy extension (see also FIG. 3). Service B is not subject to the policy of service C. The forking aspect, though, might be clearer if we consider a slight variation to the example of FIG. 14. For example, instead of Service R invoking Service B before Service C, consider what would happen if Service B were invoked after Service D. In this case, because Service R extends the policy of A rather than D when invoking service B, the policy applied to Service B's invocation can be independent of the invocation of Service D. The policy context for Service B's invocation is "forked" off of Service A independent of the earlier "forking" of Service A's policy context when Service R invoked Service C. Thus, Service B would not need to authenticate using certificates since the policy of service C does not apply. In another embodiment, such forking may yield alternative behavior, including the carrying of policy dependencies between the calls from Service R to Service B and Service C.

According to various embodiments, Grand Central RoutingProgram may extend a CallScope policy of the message that that it is routing in much the same way that a service can. In fact, as mentioned elsewhere herein, a RoutingProgram can be characterized as a service. However, RoutingPrograms can have different interfaces for policy extension than as described previously for services.

In one embodiment, RoutingPrograms may contain a directive to extend a policy. If this directive is present, the policy extended will be the policy of the last message that was received into the RoutingProgram. This is possible if the RoutingProgram has a predictable execution order. The RoutingProgram typically blocks after sending request messages by waiting for a response before continuing execution. However, this behavior makes RoutingPrograms less flexible from endpoint services acting as routers that can extend a policy of an arbitrary message at any time. If the policy extension directive is not present for a RoutingProgram, the RoutingProgram will not extend the policy in any calls.

Figure 15:
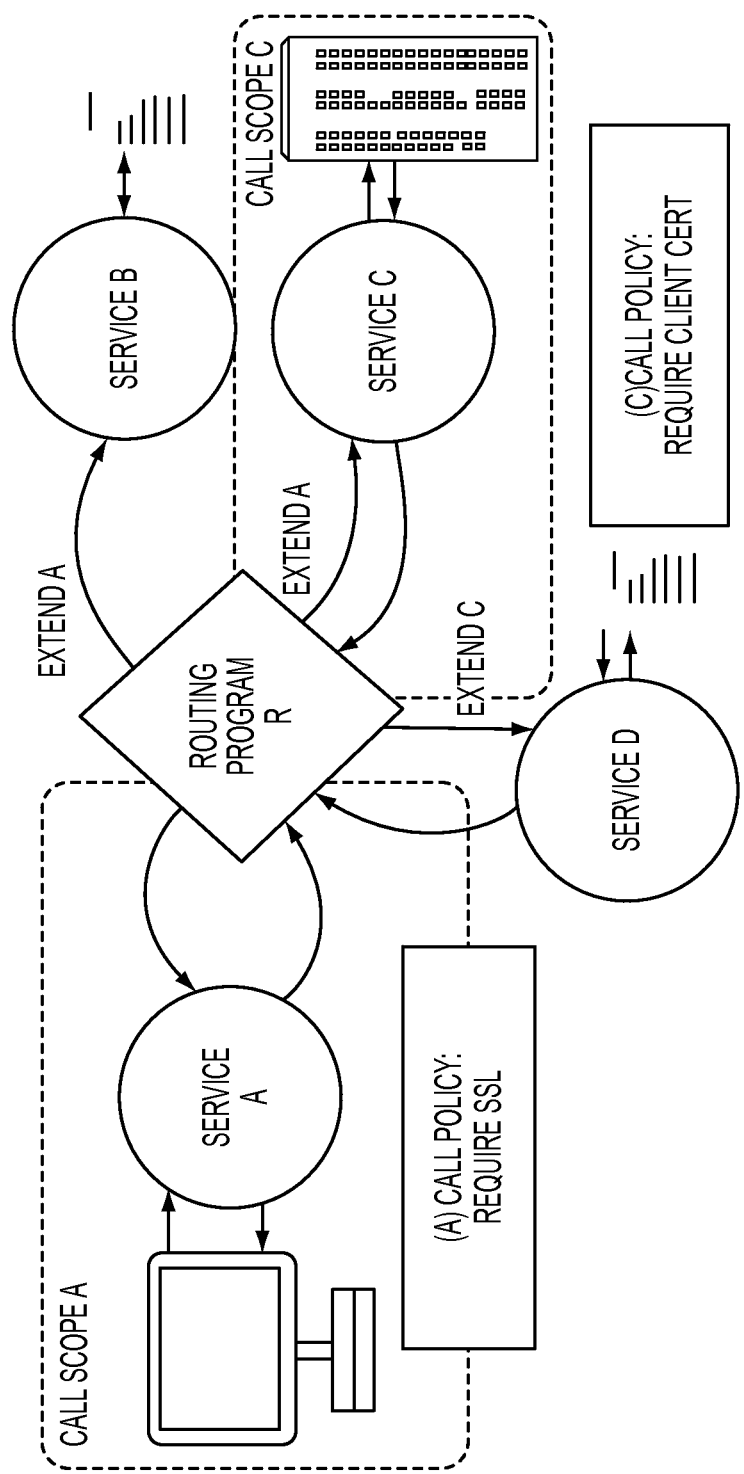

The example of FIG. 15 is similar to the one discussed above with reference to FIG. 14 except that is uses a RoutingProgram instead of an endpoint service. In this example, the RoutingProgram contains a directive to extend the policy of the most recent message received into the RoutingProgram.

According to a specific embodiment, if a user modifies a ConnectionScope Policy, the changes take effect immediately. In some embodiments, it is also possible to both remove and add assertions in a policy. If a user modifies a CallScope policy, the new assertions may be added to the CombinedPolicy at routing time if a policy has changed. No assertions are removed from a policy at routing time. This makes it possible to add assertions to a CallScope policy while a message is in transit or a message policy is being extended, but disallows the removal of assertions. Timing of policy modifications of a CallPlus policy in relationship to a PolicyEnforcementPoint can affect hether the change will take effect or not (e.g., see the table of FIG. 12).

According to a specific embodiment, messages generated by Grand Central have no policy. Examples of messages falling in this category are asynchronous SOAP faults and alerts generated by Grand Central. In one embodiment, the CombinedPolicy includes only the CallScope policy of the destination service (and any extended policies).

A PolicyViolationDeliveryGetMessage is a result of a service not meeting the policy requirements of the service(s) that participated in a policy session of a message pending delivery. In one implementation, this policy evaluation result may be raised on connection to a Grand Central "getMessage" method of poll interface. The CombinedPolicy of the delivered message is evaluated, and if a policy violation is detected, a synchronous SOAP fault is returned. In one implementation, the message is deleted, and no further attempts to retrieve it are possible. A PolicyViolation event/alert may also be generated. An asynchronous SOAP fault may also be returned to the original message sender.

Figure 16:
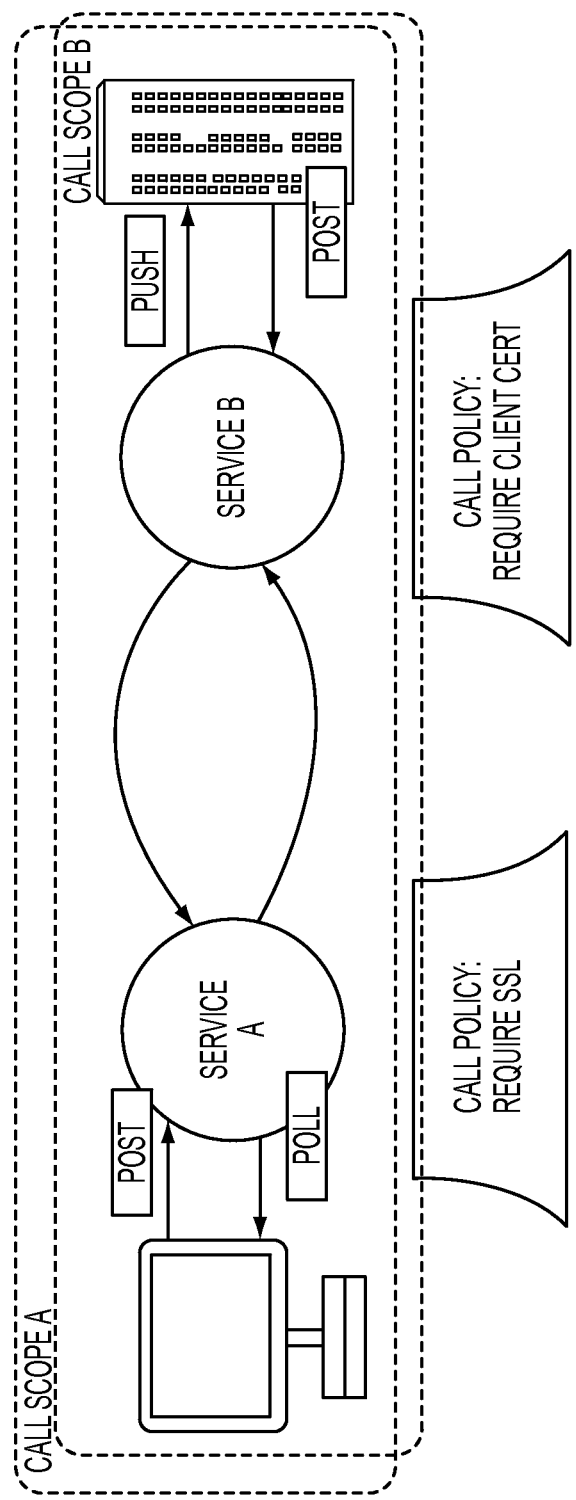

In the example illustrated in FIG. 16, Service A called a "getMessage" method of Grand Central poll API and successfully authenticated with username/password. Connection from Service A is successful because the ConnectionScope and CallScope policies of Service A allow for password authentication (by not having any policy on authentication). However, the combined Call Scope policies of Service A and B require certificate authentication. A delivery violation is therefore detected, the message is dropped from the queue, and an alert is generated.

A PolicyViolationDeliveryPush is a result of a service not meeting its own policy requirements or the policy requirements of the service(s) that participated in a policy session of a message pending delivery. In one implementation, this result may be raised on connection from Grand Central on the push interface. The ConnectionScope policy of the service and CombinedPolicy of the delivered message are evaluated, and if a violation is detected, a PolicyViolation delivery error is generated. In one implementation, the message may be deleted, and no further attempts to push it may be possible. An asynchronous SOAP fault may also be returned to the sender. If the delivery option is synchronous push, the ConnectionScope and CallScope policies of the service may be evaluated for the push response.

Figure 17:
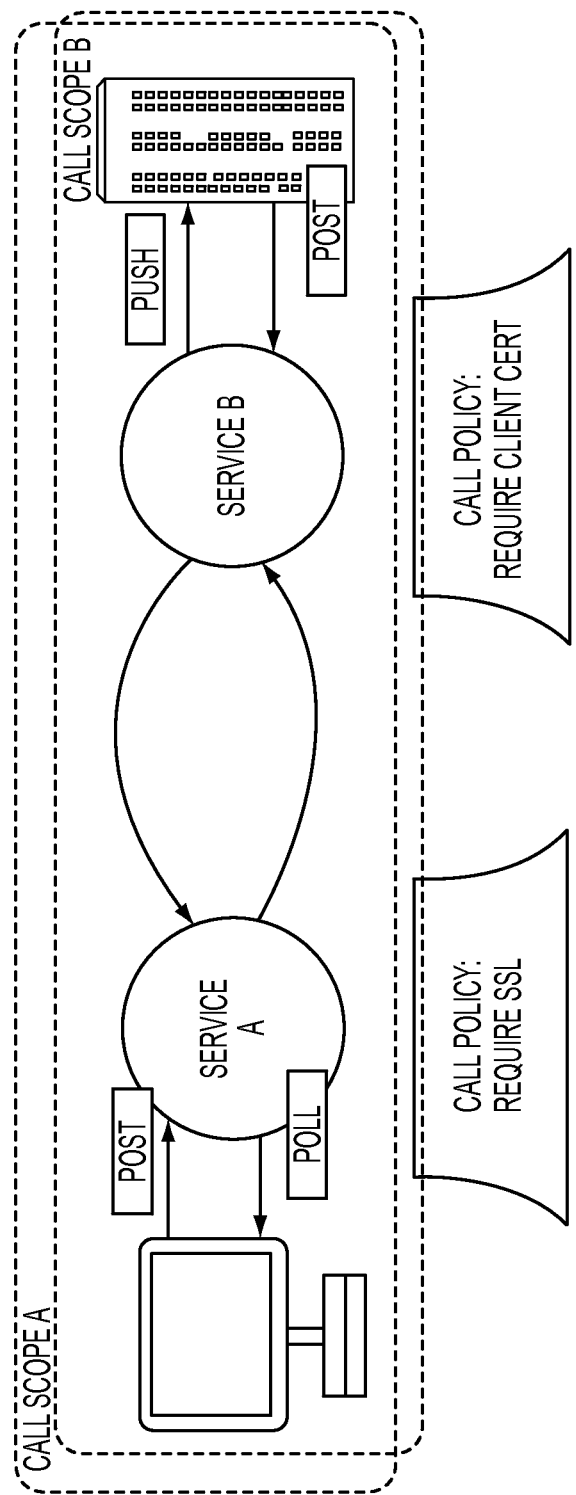

In the example illustrated in FIG. 17, Grand Central attempted to push the message from Service A to Service B using HTTP. Since Service A requires SSL encryption and Service B is configured for push without encryption, a delivery violation is flagged, and the message is dropped from the queue of Grand Central. An asynchronous SOAP fault may then be generated and returned to Service A. An alert may also be generated and sent to Service A or Service B.

Figure 18:
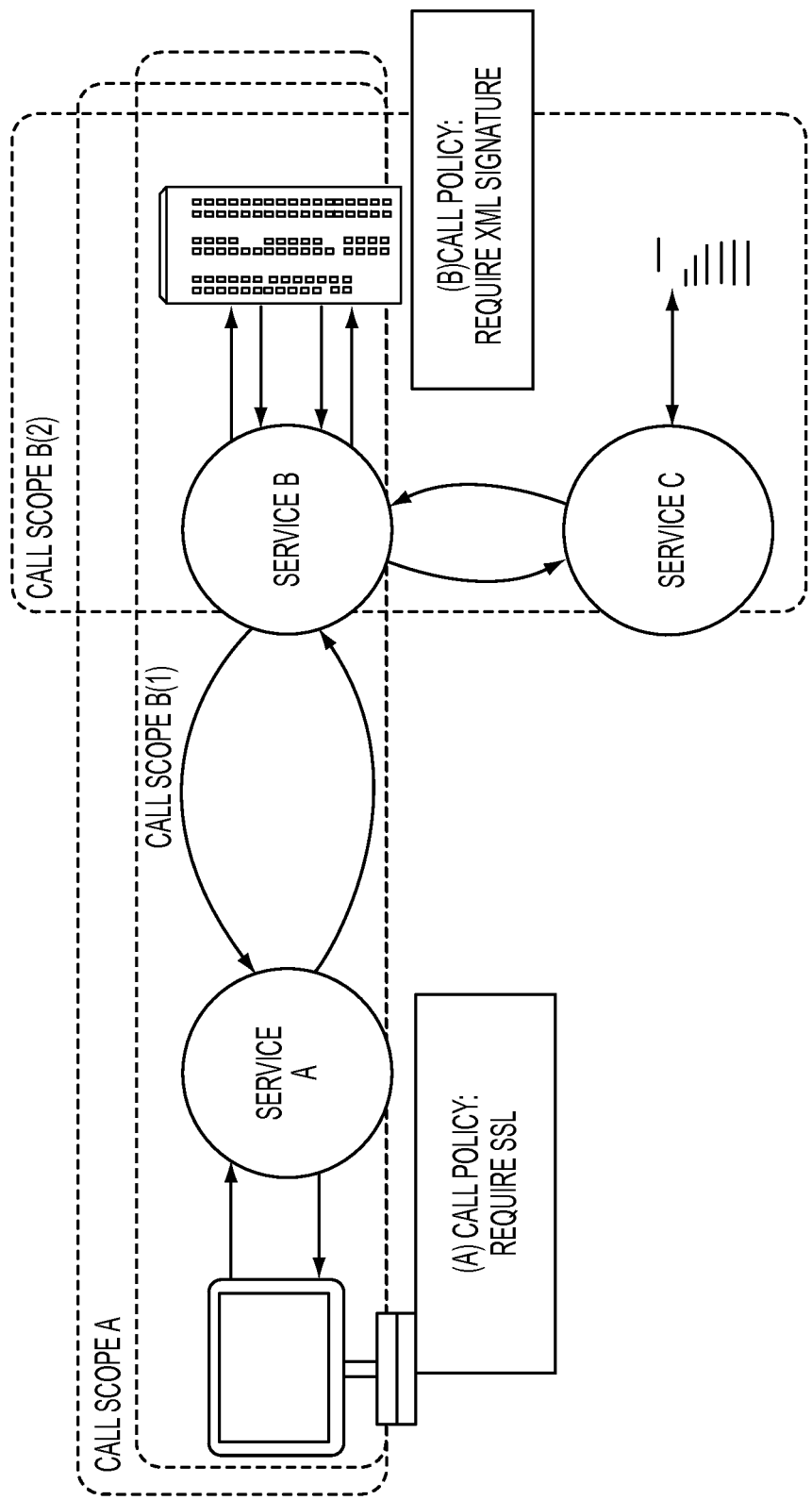

In the example of FIG. 18, Service C responded to a synchronous push with a message that was not digitally signed. A posting error is flagged (since Service C must satisfy Service B's policy), and the response is dropped. An asynchronous SOAP fault is generated and returned to Service B.

A PolicyViolationPollApi is a result of a service not meeting its policy requirements when using a Grand Central poll API. In one implementation, this result may be raised on connection to Grand Central on all methods of poll interface. The ConnectionScope and CallScope policies of the service are then evaluated. If a violation is detected, a synchronous SOAP fault may be returned.

Figure 19:
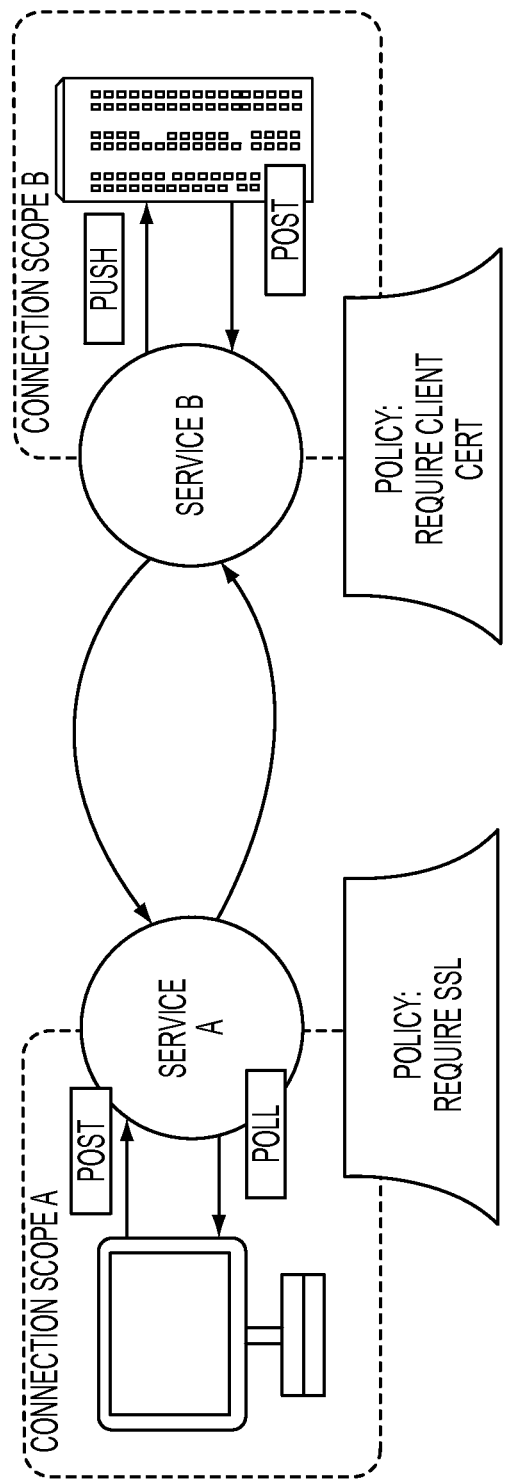

In the example of FIG. 19, Service A called a "getCatalog" method of Grand Central poll API over HTTP. Service A has a policy requiring SSL. The method call is rejected with a synchronous SOAP fault.

Figure 20:
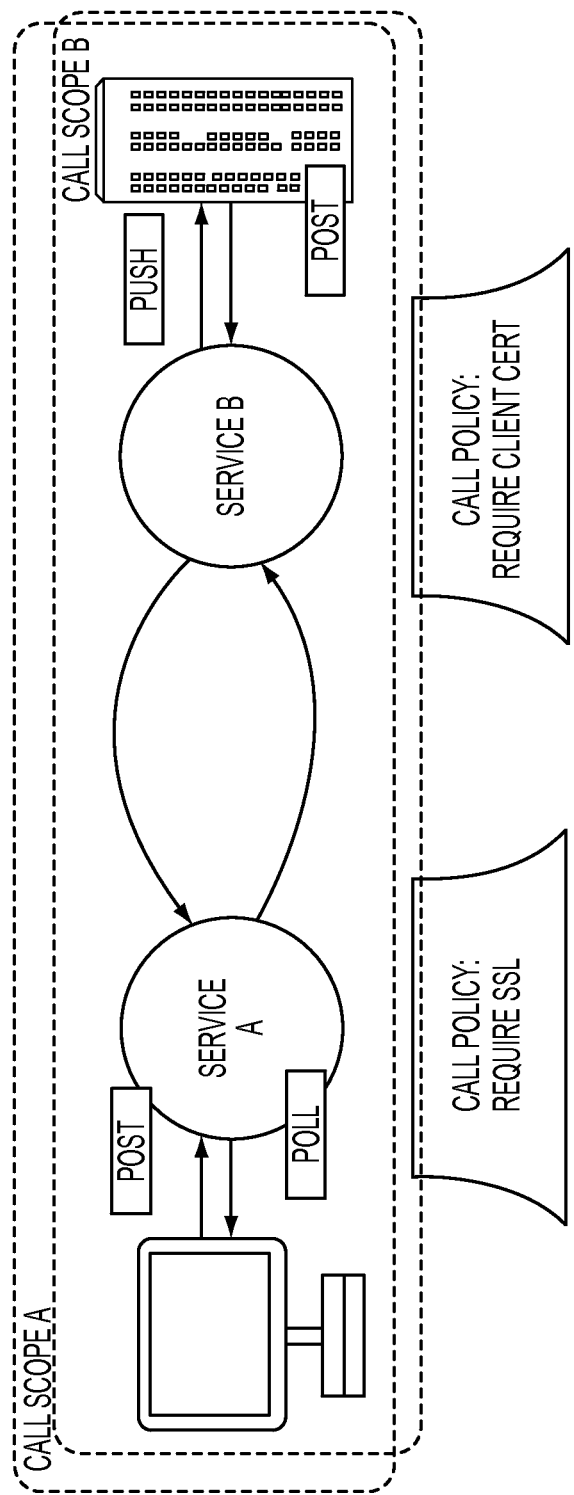

In the example of FIG. 20, Service A called a "getMessage" method of Grand Central poll API over HTTP. The method call is rejected with a synchronous SOAP fault. The pending message remains in the queue.

A PolicyViolationPost is a result of a sender service not meeting its policy requirements when posting messages to Grand Central. In one implementation, this result is raised on connection to Grand Central on post interface. The ConnectionScope and CallScope policies of the sender service are then evaluated. If a violation is detected, a synchronous SOAP fault may be returned. Alerts may or may not be generated and sent to participating services. If PolicyExtension is performed, the extension token value may also be verified to have the correct syntax and format of a Grand Central token.

Figure 21:
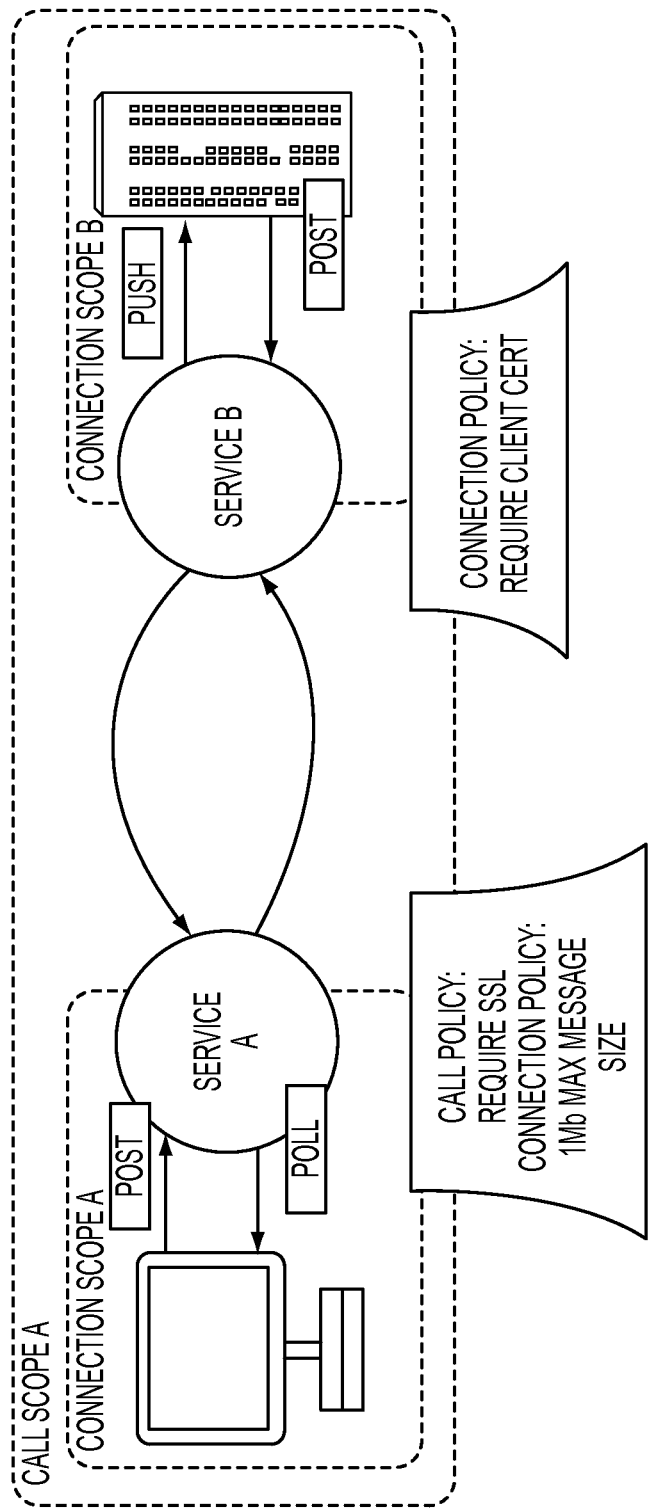

In the example of FIG. 21, Service A posted the message to Grand Central over HTTP. The message is rejected with a synchronous SOAP fault. If Service A posted a message to Grand Central which is bigger than 1 Mb, then the message is also rejected.

A PolicyViolationRouting is a result of one or more services violating policies of other participants in a policy session. In one implementation, this result is raised by the Grand Central routing core. The CallScope policy of the posted message is merged with the policy of the destination service resulting in a CombinedPolicy. If a violation is detected, a PolicyViolation event/alert may be generated. The message may also be deleted, and preferably no further attempts to retrieve it are possible. An asynchronous SOAP fault is returned to the sender. If a Policy Extension is performed, the extension token is verified to comply with rules of PolicyExtension.

Figure 22:
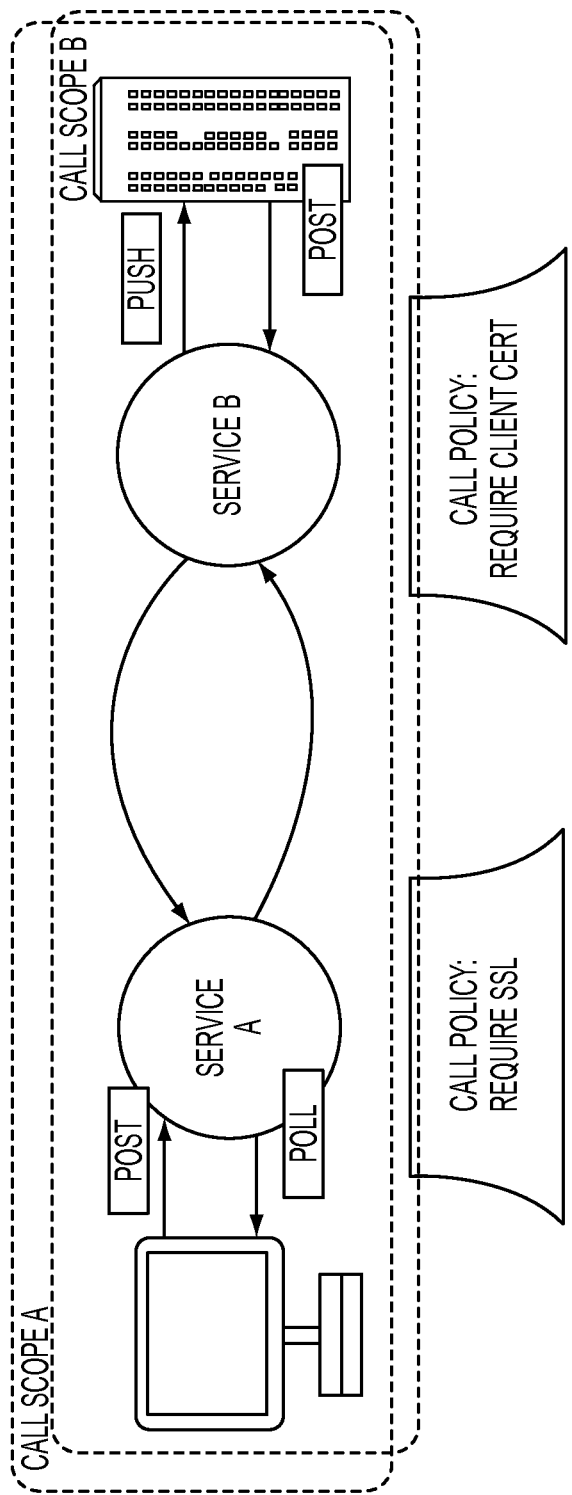

In the example illustrated in FIG. 22, Service A posted a message to Grand Central over HTTPs and successfully authenticated with username/password because the ConnectionScope and CallScope policies of Service A allow for password authentication. However, the combined CallScope policies of Services A and B require certificate authentication. Therefore, a routing policy violation is flagged, and an asynchronous SOAP fault is generated and returned to Service A. A policy violation event is generated and an alert may be sent to either Service A or B.

A PolicyViolationSync is a result of sender and destination services not meeting their own policy requirements and/or the policy requirements of each other. In one implementation, this result is raised on connection to Grand Central on a synchronous interface. The synchronous interface handler may perform the same operations as the asynchronous interface which may result in the following policy violations: PolicyViolationPost, PolicyViolationRouting, and PolicyViolationDeliveryPush. If a violation is detected, the synchronous SOAP fault may be returned to the sender, and the message may be dropped. A PolicyViolation event/alert may be generated depending on the condition. Most preferably, no asynchronous SOAP faults are generated.

Figure 23:
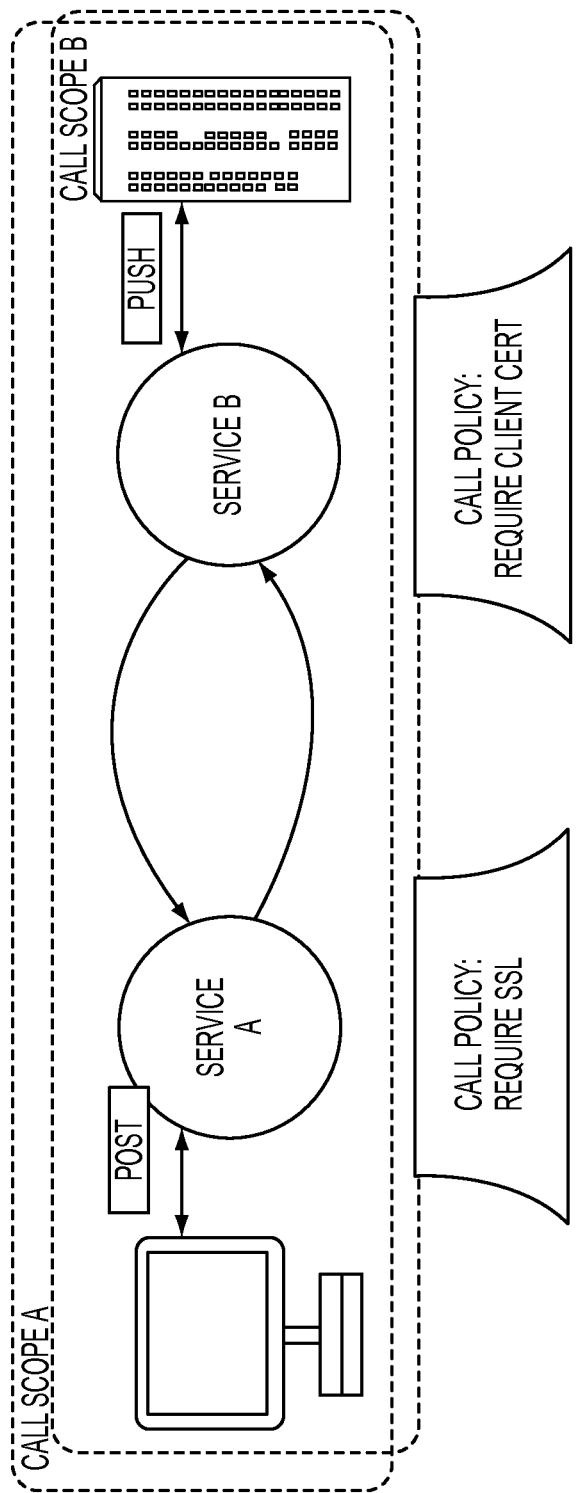

In the example illustrated in FIG. 23, Service A posted a message to a Grand Central synchronous pop over HTTP (no SSL). The post is rejected with a synchronous SOAP fault. If Service B attempted to push the message using HTTP, a delivery violation is flagged, and an event is generated. The post is rejected with a synchronous SOAP fault. Service A can post the message to the Grand Central sync pop over HTTPs and successfully authenticate with username/password because the ConnectionScope and CallScope policies of Service A allow for password authentication. However, the combined CallScope policies of Services A and B require certificate authentication. Therefore, a routing policy violation is flagged, an event is generated, and the post is rejected with a synchronous SOAP fault. An alert may also be generated and sent to either or both of Services A and B.

A PolicyVisibiltyAssertion is used by a service to express whether its policy may be visible to other services or kept private. In some implementations, this assertion does not affect Policy evaluation. The value of the policy visibility assertion (as selected by a user) is used to determine the actions that Grand Central is allowed to perform on the information contained in the policy. In one implementation, policy assertions are not directly editable by users and are selected from a set of policy options. This policy may be a part of predefined policies supported by Grand Central.

In a specific embodiment, the syntax may be:
<gc:PolicyVisibilityAssertion Type=" . . . "/>
where example values for Type include "private," i.e., the policy is never visible to any users or services (except the owner), and "public," i.e., the policy may be visible to any users or services in, for example, the service directory or in the detail section of delivered SOAP fault messages.

Public is the default value of this assertion to facilitate debugging of policy violations both by internal staff and clients. In one embodiment, in the case of CallScope policy violations, the policy is visible if and only if the policies of all participating services are public.

The PushDeliveryIdentityVerificationOption is an advanced option of push delivery governing the preference for server identity verification whereby specific values of the server's certificate are examined. In one implementation, this option may be specified at service configuration time. Grand Central is preferably configured to verify that the server certificate of the web service is signed by an acceptable certificate authority (CA). Grand Central may also verify the organization (O) and common name (CN) data of the server certificate of the web service. ServerIdentityVerificationAssertion contains the rules for this verification.

The RoutingProgramPolicyExtensionOption is an advanced option of a Grand Central routing program specifying whether it will extend a policy or not. In one implementation, this option may be specified at routing program configuration time. Allowed values may be "true" (extend policies of the last message that was received by a routing program) or "false" (do not extend). If true, then the rules of PolicyExtensionByRoutingPrograms apply.

The SecurityTokenAssertion may be used by a service to express the required type of authentication. In one embodiment, this assertion applies to all connection to Grand Central on post, poll and sync interfaces. Assertions are preferably not directly editable by users and are selected from a set of policy options. They may be a part of predefined policies supported by Grand Central.

In one implementation the syntax may be:
<wsse:SecurityToken TokenType=" . . . "/>
where example values for TokenType include "UsernameToken" which requires that authentication to Grand Central uses a password. In one embodiment, the assertion will evaluate to true if and only if a valid password credential was submitted in the HTTP authorization header or the SOAP WS-Security header element. The value "X509v3" requires that authentication to Grand Central uses a X509v3 certificate. In one embodiment, assertion will evaluate to true if and only if valid X509v3 certificate credential was submitted as part of SSL handshake.

The ServerIdentityVerificationAssertion is used by a service to verify identity of a Web Service by examining its X509 certificate. In one embodiment, this assertion applies to all connections from Grand Central on push and sync interfaces. Assertions are preferably not directly editable by users and are selected from a set of policy options. They may be a part of predefined policies supported by Grand Central. In one implementation the syntax may be:
<gc:ServerIdentityVerificationAssertion Type=" . . . "/>
where an example value for Type is "verified" which requires that Grand Central verify the X509v3 server certificate of a Web Service. In one implementation, an assertion evaluates to true if and only if the X549 certificate is signed by, a trusted CA. In the current example, the assertion will evaluate to true if and only if the X509 certificate is successfully verified by Grand Central against information stored in a service profile.

Following are examplary verification rules: the certificate is at least 128-bit X.509; the certificate's O value exactly matches (case insensitive) the O value registered for the service; the certificate's CN value exactly matches (case insensitive) the CN value registered for the service; the push URL host matches the CN value (if used with push delivery).

The TransportLevelSecurityAssertion is used by a service to express the required type of transport level security. This assertion preferably applies to all connections to and from Grand Central on all interfaces. Assertions are preferably not directly editable by users and are selected from a set of policy options. They may be a part of predefined policies supported by Grand Central. In one implementation the syntax may be:
<gc:TransportLevelSecurityAssertion Type=" . . . "/>
where an example value for Type is "ssl" which requires that a connection be established using SSL or TLS protocol for data encryption over HTTP. The assertion will evaluate to true if and only if the secure sockets layer transfer protocol is used. In one embodiment, for post and poll APIs it is determined by analyzing the schema of the URL that the connection to Grand Central was initiated with. For push delivery—it is determined by analyzing the schema in the push URL and verifying that a secure socket was successfully opened to a server with a strength of at least 128 bit.

Another example value for Type is "ipSec" which requires that a connection be established using the IpSec protocol for data encryption over a VPN. In one embodiment, the interfaces may determine the protocol by examining the source IP address whereby connections via a VPN are mapped to specific IP addresses by a network device.

Figure 24:
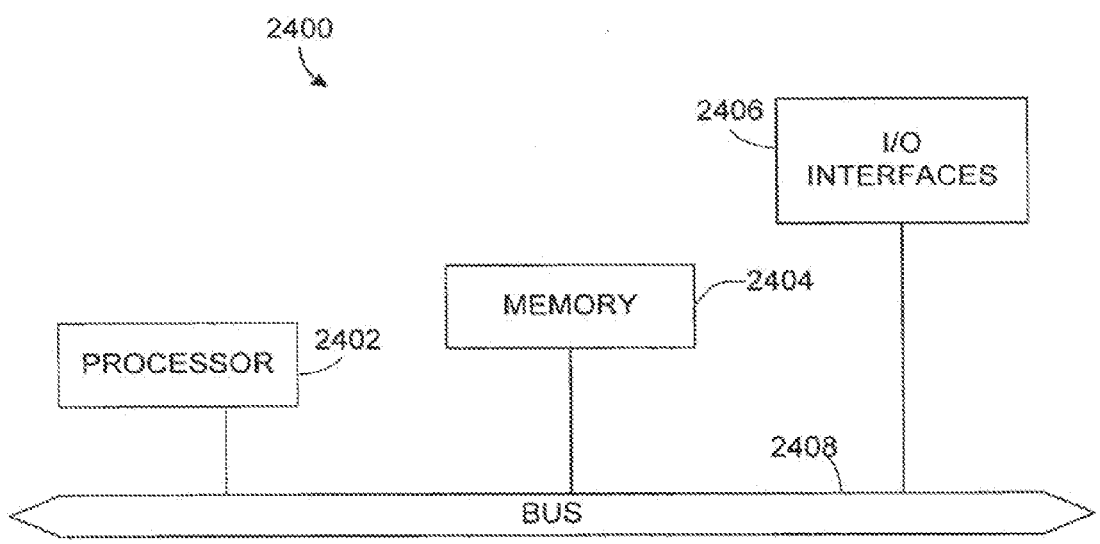
FIG. 24 is a block diagram of a computer system suitable for implementing various aspects of the present invention.

Referring now to FIG. 24, a computer system 2400 suitable for implementing various aspects of the present invention (e.g., server 707 of FIG. 7) includes one or more central processing units (CPUs) 2402, one or more blocks of memory 2404, input and output interfaces 2406, and a bus 2408 (e.g., a PCI bus). Alternatively, computer systems employing point-to-point infrastructures instead of buses may also be employed. When acting under the control of appropriate software or firmware, CPU 2402 is responsible for implementing various portions of the techniques of the present invention. It preferably accomplishes all these functions under the control of software including an operating system and any appropriate applications software. CPU 2402 may include one or more processors. In a specific embodiment, some portion of memory 2404 (such as non-volatile RAM and/or ROM) also forms part of CPU 2402. However, there are many different ways in which memory could be coupled to the system. Memory block 2404 may be used for a variety of purposes such as, for example, caching and/or storing data, program code, etc.

The input and output interfaces 2406 typically provide an interface to various I/O devices, such as mouse, keyboard, display, as well as providing an communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

It will be understood that the system shown in FIG. 24 is an exemplary computer system and is by no means the only system architecture on which the various aspects of the present invention can be implemented.

Regardless of system's configuration, it may employ one or more memories or memory modules (such as, for example, memory block 2404) configured to store data, program instructions for the general-purpose network operations and/or the inventive techniques described herein. The program instructions may control the operation of an operating system and/or one or more applications, for example. The memory or memories may also be configured to store information in a repository directory.

Because such information and program instructions may be employed to implement the systems/methods described herein, the present invention also relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, exemplary policies have been described herein as being associated with a service. It will be understood, however, that policies may be associated with any communication component or entity associated with a network in which the invention is implemented. For example, policies may be associated with a particular enterprise or individual users within an enterprise. Therefore, the invention should not be limited to associating policies with services.

It should also be noted that, while some of the examples herein are described with reference to SOAP messages, the techniques described herein apply to a wide variety of message formats and protocols including, for example, FTP, EDI, generic HTTP, XML, text files, etc. The invention should therefore not be limited to any specific message format or protocol.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

The invention claimed is:

1. A computer program product, comprising a non-transitory computer usable medium having a computer readable program code embodied therein, the computer readable program code adapted to be executed to implement a method, the method comprising:
   storing policy data for a plurality of network nodes in at least one database including:
   storing first policy data of a first one of the network nodes, the first one of the network nodes including a user and the first policy data particular to the user and used for password authentication of the user, and
   storing second policy data of a second one of the network nodes, the second one of the network nodes including one of an application and a service and the second policy data particular to the one of the application and the service;
   receiving a message from the user for being transmitted in a network to the one of the application and the service;
   in response to the receipt of the message, identifying from the at least one database the first policy data of the user and the second policy data of the one of the application and the service;
   combining the identified first policy data with the identified second policy data thereby resulting in combined policy data, wherein the combined policy data is honored by both the user and the one of the application and the service;
   associating the combined policy data with the message;
   handling the message in the network with reference to the combined policy data including:
      evaluating the combined policy data with respect to the received message,
      determining whether the message is associated with a policy violation, based on the evaluation of the combined policy data,
      rejecting the message when the combined policy data is violated, and transmitting a policy violation message to either or both of the first and second entities; and
      transmitting the message when the combined policy data is not violated.

2. The computer program product of claim 1, further comprising storing policy audit data for at least one of the network nodes associated with the network, the policy audit data comprising information relating to compliance of the at least one of the network nodes with at least a portion of the policy data.

3. The computer program product of claim 2, further comprising generating reports using the policy audit data.

4. The computer program product of claim 1, further comprising facilitating configuration of the policy data associated with at least one of the network nodes.

5. The computer program product of claim 4, wherein facilitating configuration of the policy data includes facilitating presentation of graphical user interfaces to users associated with the at least one of the network nodes.

6. The computer program product of claim 1, wherein the plurality of network nodes include at least one of organizations, individuals, computing platforms, software applications, and services.

7. The computer program product of claim 1, wherein the policy data relate to at least one of security, message format, network protocols, routing, organizations, users, and roles.

8. The computer program product of claim 1 wherein the first, second, and combined policy data each include at least one policy assertion, and further comprising evaluating the message for compliance with the at least one policy assertion at a point within the network.

9. The computer program product of claim 1, wherein the first, second, and combined policy data each include a plurality of policy assertions, and further comprising code for evaluating different ones of the policy assertions at different points within the network.

10. A method, comprising:
    storing policy data for a plurality of network nodes in at least one database including:
    storing first policy data of a first one of the network nodes, the first one of the network nodes including a user and the first policy data particular to the user and used for password authentication of the user, and
    storing second policy data of a second one of the network nodes, the second one of the network nodes including one of an application and a service and the second policy data particular to the one of the application and the service;
    receiving a message from the user for being transmitted in a network to the one of the application and the service;
    in response to the receipt of the message, identifying from the at least one database the first policy data of the user and the second policy data of the one of the application and the service;
    utilizing at least one computer-processor, combining the identified first policy data with the identified second policy data thereby resulting in combined policy data, wherein the combined policy data is honored by both the user and the one of the application and the service;
    associating the combined policy data with the message;
    handling the message in the network with reference to the combined policy data including:
       evaluating the combined policy data with respect to the received message,
       determining whether the message is associated with a policy violation, based on the evaluation of the combined policy data,
       rejecting the message when the combined policy data is violated, and transmitting a policy violation message to either or both of the first and second entities; and
       transmitting the message when the combined policy data is not violated.

11. The method of claim 10, further comprising associating the first policy data and the combined policy data with the message such that the first policy data and the combined policy data are transmitted with the message in the network.

12. An interoperability network, comprising:
    at least one database having policy data for network nodes stored therein; and at least one computing device for:

storing first policy data of a first one of the network nodes, the first one of the network nodes including a user and the first policy data particular to the user and used for password authentication of the user, and storing second policy data of a second one of the network nodes, the second one of the network nodes including one of an application and a service and the second policy data particular to the one of the application and the service;

receiving a message from the user for being transmitted in a network to the one of the application and the service;

in response to the receipt of the message, identifying from the at least one database the first policy data of the user and the second policy data of the one of the application and the service;

combining the identified first policy data with the identified second policy data thereby resulting in combined policy data, wherein the combined policy data is honored by both the user and the one of the application and the service;

associating the combined policy data with the message;

handling the message in the network with reference to the combined policy data including:

evaluating the combined policy data with respect to the received message, determining whether the message is associated with a policy violation, based on the evaluation of the combined policy data, rejecting the message when the combined policy data is violated, and transmitting a policy violation message to either or both of the first and second entities; and transmitting the message when the combined policy data is not violated.

13. The interoperability network of claim 12, wherein the at least one computing device includes a plurality of components, and the message is handled at each of the components with reference to only a portion of the first policy data or the combined policy data, thereby distributing handling of the message with reference to all of the first policy data or combined policy data among the components.

14. The computer program product of claim 1, wherein the combination of the first policy data with the second policy data is a logical combination.

15. The computer program product of claim 1, wherein an entirety of the first policy is combined with an entirety of the second policy data.

16. The computer program product of claim 1, wherein a scope of the first policy data corresponds to a connection.

17. The computer program product of claim 1, wherein the scope of the first policy data only corresponds to a connection associated with the user.

18. The computer program product of claim 1, wherein the policy data in the at least one database is enforced for each of a plurality of messages in the interoperability network in dependence on a context associated with each of the messages.

19. The computer program product of claim 1, further comprising recording a historical record of the evaluation of the combined policy with respect to the message.

20. The computer program product of claim 1, further comprising sending a notification to the user when it is determined that the message is associated with the policy violation.

21. The computer program product of claim 1, wherein the second policy data is used for control of access to information of the one of the application and the service.

22. The computer program product of claim 21, wherein the message from the user is for accessing by the user the information of the one of the application and the service.

* * * * *